(12) United States Patent
Miyamori et al.

(10) Patent No.: US 8,059,951 B2
(45) Date of Patent: Nov. 15, 2011

(54) IMAGE STABILIZING DEVICE AND CAMERA

(75) Inventors: Kenichi Miyamori, Hyogo (JP); Akio Konishi, Hyogo (JP); Hiroyasu Fujinaka, Osaka (JP); Hirotsugu Yabuta, Osaka (JP); Makoto Umeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/665,207

(22) PCT Filed: Jun. 18, 2008

(86) PCT No.: PCT/JP2008/001563
§ 371 (c)(1),
(2), (4) Date: Dec. 17, 2009

(87) PCT Pub. No.: WO2008/155906
PCT Pub. Date: Dec. 24, 2008

(65) Prior Publication Data
US 2010/0195206 A1  Aug. 5, 2010

(30) Foreign Application Priority Data

Jun. 20, 2007  (JP) .................. 2007-162073

(51) Int. Cl.
G03B 17/00 (2006.01)
G02B 27/64 (2006.01)
(52) U.S. Cl. .......................... 396/55; 359/557
(58) Field of Classification Search .............. 396/55; 348/208.99, 208.4, 208.5, 208.7, 208.11; 359/554, 555, 557
See application file for complete search history.

(56) References Cited

U.S. PATENT DOCUMENTS

| 5,689,369 A | 11/1997 | Noguchi |
| 2007/0183766 A1 | 8/2007 | Miyamori et al. |
| 2009/0252484 A1* | 10/2009 | Hasuda ........................ 396/55 |

FOREIGN PATENT DOCUMENTS

| EP | 1 950 608 A1 | 7/2008 |
| JP | 7-005514 A | 1/1995 |
| JP | 8-043769 A | 2/1996 |

(Continued)

*Primary Examiner* — W. B. Perkey
*Assistant Examiner* — Minh Phan
(74) *Attorney, Agent, or Firm* — Hamre, Schumann, Mueller & Larson P.C.

(57) ABSTRACT

An image stabilizing device of the present invention includes: a correction lens holding member 405 to which a correction lens G3 included in an optical system of a camera is fixed; a lens holding member 408 that holds the correction lens holding member so that the correction lens holding member is movable in a rectilinear direction that is an arbitrary direction in a plane orthogonal to an optical axis A of light entering the correction lens G3 and in a rotation direction along an arc in the plane about a rotary shaft A3 substantially parallel to the optical axis A; a driving portion for rectilinear movement 412 that applies a driving force to the correction lens holding member 405 in order to drive the correction lens holding member 405 in the rectilinear direction; and a driving portion for rotation 413 that applies a driving force to the correction lens holding member 405 in order to drive the correction lens holding member 405 in the rotation direction. According to this configuration, it is possible to provide an image stabilizing device that achieves miniaturization, while preventing a deterioration in image stabilizing performance, and a camera including the same.

26 Claims, 21 Drawing Sheets

FOREIGN PATENT DOCUMENTS

| | | |
|---|---|---|
| JP | 11-258678 A | 9/1999 |
| JP | 2000-075338 A | 3/2000 |
| JP | 2003-169236 A | 6/2003 |
| JP | 2004-102089 A | 4/2004 |
| JP | 2006-065352 A | 3/2006 |
| JP | 2007-241254 A | 9/2007 |
| WO | WO 2007/055356 A | 5/2007 |

* cited by examiner

IMAGE STABILIZING DEVICE AND CAMERA

TECHNICAL FIELD

The present invention relates to an image stabilizing device and a camera. This invention particularly relates to an image stabilizing device that drives a correction lens so as to perform image stabilization and a camera including the image stabilizing device.

BACKGROUND ART

Recent years have seen the widespread use of a digital camera that uses an imaging element such as a CCD (charge coupled device) or CMOS (complementary metal-oxide semiconductor) sensor to convert an optical image into an electric signal and to record the electric signal in a digitized form. In a digital camera configured as above, there is a need not only for increasing the number of pixels of a CCD or CMOS sensor but also for improving the performance of a lens barrel that forms an optical image on such an imaging element. Specifically, there is a need for a lens barrel incorporating a higher-powered zoom lens system.

Meanwhile, in the field of a digital camera, there is a demand for miniaturization of a body in order to improve portability. To this end, there is a need for miniaturization of an imaging apparatus including a lens barrel and an imaging element, which is believed to contribute greatly to miniaturization of the body. In an effort to achieve the above-described miniaturization of an imaging apparatus, a so-called bending optical system has been proposed, which achieves the miniaturization of the apparatus without changing the length of an optical path by bending a zoom lens system at some point along the optical path.

For example, Patent Document 1 discloses a bending optical system in which an optical path is bent using a reflection mirror. Specifically, a lens barrel disclosed in Patent Document 1 includes on the side of a subject relative to the reflection mirror, a first lens group and a second lens group in this order from the side of the subject, and on the side of an imaging element relative to the reflection mirror, a third lens group and a fourth lens group in this order from the side of the reflection mirror. The first lens group is fixed. The second lens group and the third lens group are movable in an optical axis direction and constitute a zoom lens system in cooperation with each other. The fourth lens group is used for focus adjustment.

Furthermore, Patent Document 2 discloses a bending optical system in which an optical path is bent using a prism. Specifically, a lens barrel disclosed in Patent Document 2 includes a lens group on the side of a subject relative to the prism. The lens group is movable between an in-use position and a retracted position in an optical axis direction. Moreover, the prism is movable so that a space for accommodating the lens group is secured when the lens group is in the retracted position.

Furthermore, Patent Document 3 discloses a configuration of a lens group used in a bending optical system.

However, in order to simultaneously meet the rising demands for the realization of a high-power zoom lens system and the achievement of miniaturization, further improvement is required.

Specifically, in each of the configurations disclosed in Patent Documents 1 and 2, respectively, it is difficult to construct a high-power zoom lens system while achieving miniaturization of the apparatus. Moreover, also when adopting the lens configuration disclosed in Patent Document 3, Patent Document 3 is disadvantageous in that it does not disclose any configuration for achieving miniaturization of the apparatus.

Meanwhile, generally, in the case of a miniaturized imaging apparatus or in the case of including a high-power zoom lens system, there is a need for preventing blurring of a photographed image (image blurring) from occurring, which mainly is due to camera shake or the like.

FIG. 18 is an exploded perspective view of an image stabilizing device of the prior art (see Patent Document 4). In the image stabilizing device shown in FIG. 18, a second lens group 101 is held by a lens frame 102. The lens frame 102 is supported movably by guide shafts 103 that guide movement in a pitching direction and in a yawing direction. Further, the lens frame 102 is provided with coils 104a and 104b for driving the lens frame 102 in the pitching direction and in the yawing direction, respectively. On a fixed base 105, magnets 106a and 106b are provided so as to be opposed to the coils 104a and 104b, respectively. When the coils 104a and 104b are energized, driving forces are generated in the respective directions. The second lens group 101 is driven in the pitching direction and in the yawing direction by the driving forces generated in the coils 104a and 104b, respectively. The amount of shake of a lens barrel is detected by angular velocity sensors 107a and 107b, and based on a detection signal obtained as a result of the detection, the coils 104a and 104b are energized so that image stabilization is performed.

Patent Document 1: JP 11(1999)-258678 A
Patent Document 2: JP 2003-169236 A
Patent Document 3: JP 2004-102089 A
Patent Document 4: JP 2000-75338 A (FIG. 4)
Patent Document 5: JP 7(1995)-5514 A (FIGS. 6 and 8)

DISCLOSURE OF THE INVENTION

Problem to be Solved by the Invention

There exists a demand for miniaturization also of an imaging apparatus incorporating an image stabilizing device. In order to meet this demand, in a conventional image stabilizing device to be incorporated in an imaging apparatus, an attempt has been made to reduce the dimension thereof in the direction of an optical axis of light entering the image stabilizing device.

Meanwhile, there is a growing need for incorporating an image stabilizing device in various imaging apparatuses. In this case, in order to increase the degree of freedom in designing an imaging apparatus, there is a need not only for reducing the dimension of the image stabilizing device in the direction of an optical axis but also for reducing the dimension thereof in either of directions orthogonal to the optical axis. For example, in the case where the above-described image stabilizing device is incorporated in an imaging apparatus having a bending optical system, if the conventional image stabilizing device is incorporated on a light emission side of a reflection mirror or a prism, the dimension of the imaging apparatus in a direction perpendicular to an optical axis of light entering the image stabilizing device is increased. That is, the dimension of the imaging apparatus in an optical axis direction of light entering the reflection mirror or the prism (thickness of the imaging apparatus) is increased. The reason for this is that in the conventional image stabilizing device, two driving portions that drive a correction lens for image stabilization in the pitching direction and in the yawing direction are arranged respectively in positions away from each other at 90 degrees relative to the correction lens.

Furthermore, as described above, in the conventional image stabilizing device, the guide shafts 103 are provided so that a pitching movement frame and a yawing movement frame are movable rectilinearly in the pitching direction and in the yawing direction, respectively. Therefore, spaces for installing the guide shafts 103 are required, hindering miniaturization of the image stabilizing device.

Furthermore, not limited to the case of such an imaging apparatus having a bending optical system, it would be more appealing to customers for imaging apparatuses to incorporate an image stabilizing device having a reduced dimension in either of directions orthogonal to an optical axis so as to reduce a dimension of an imaging apparatus in any direction.

Therefore, for achieving further miniaturization of an image stabilizing device, an image stabilizing device has been proposed in which a correction lens is driven to be rotated about a rotary shaft disposed substantially parallel to an optical axis of the correction lens (see, for example, Patent Document 5). FIGS. 19 and 20 are exploded perspective views of image stabilizing devices of the prior art.

The image stabilizing device shown in FIG. 19 is composed mainly of a supporting frame 15 to which a correction lens 16 is fixed, a supporting arm 13 that holds the supporting frame 15 so that the supporting frame 15 is movable rectilinearly, and a barrel 11 that rotatably holds the supporting arm 13. In this image stabilizing device, the supporting arm 13 is driven to be rotated in a direction along an arc about a shaft 45a with respect to the barrel 11 by a permanent magnet 45 attached to the supporting arm 13 and a coil 46a attached to the barrel 11. The supporting frame 15 is driven in a direction orthogonal to an optical axis with respect to the supporting arm 13 by permanent magnets 47a and 47b attached to the supporting frame 15 and a coil 49 attached to the supporting arm 13. These configurations allow the correction lens 16 to be movable in a plane orthogonal to the optical axis in a pitching direction and in a yawing direction.

Furthermore, the image stabilizing device shown in FIG. 20 is composed mainly of a supporting frame 15 to which a correction lens 16 is fixed, a supporting arm 13 that rotatably holds the supporting frame 15, and a barrel 11 that holds the supporting arm 13 so that the supporting arm 13 is movable rectilinearly. In this image stabilizing device, the supporting arm 13 is driven in a direction orthogonal to an optical axis with respect to the barrel 11 by a coil 62y attached to the supporting arm 13 and permanent magnets 63y attached to the barrel 11. The supporting frame 15 is driven in a direction orthogonal to the optical axis with respect to the supporting arm 13 by a coil 62p attached to the supporting frame 15 and permanent magnets 63p attached to the supporting arm 13. These configurations allow the correction lens 16 to be movable in a plane orthogonal to the optical axis in a pitching direction and in a yawing direction.

In each of the image stabilizing devices shown in FIGS. 19 and 20, a supporting frame as one of the above-described configurations is driven in a direction along an arc about a rotary shaft. Therefore, a frictional force exerted when the supporting frame is driven is reduced, and miniaturization of a driving portion having a coil and permanent magnets is allowed. Further, when compared with the above image stabilizing devices described in Patent Documents 1 to 4, a guide shaft for rectilinear movement is omitted. This allows miniaturization of a guide mechanism. That is, the image stabilizing devices shown in FIGS. 19 and 20 allow further miniaturization.

However, there is a concern about deterioration in image stabilizing performance of the image stabilizing devices shown in FIGS. 19 and 20. Specifically, in the image stabilizing device shown in FIG. 19, a driving force for rotating the correction lens 16 acts on the supporting arm 13 but does not directly act on the supporting frame 15 to which the correction lens 16 is fixed. Further, in the image stabilizing device shown in FIG. 20, a driving force for rectilinearly moving the correction lens 16 acts on the supporting arm 13 but does not directly act on the supporting frame 15 to which the correction lens 16 is fixed. Because of this, a lens holding member might not be held in a desired position depending on the dimensional precision of a portion at which the supporting arm 13 and the supporting frame 15 are coupled to each other. It is feared that this might lead to a deterioration in the positional precision of the correction lens.

As described above, there is a fear that as a result of achieving miniaturization, image stabilizing performance might deteriorate.

Furthermore, in the image stabilizing devices described in Patent Documents 1 to 4, for example, guide shafts are fixed by adhesion. Because of this, in the course of manufacturing the image stabilizing devices, an operation of applying and drying an adhesive is required. This renders manufacturing operations complicated, thus leading to an increase in manufacturing cost.

It is an object of the present invention to provide an image stabilizing device that can achieve miniaturization and a reduction in manufacturing cost, while preventing a deterioration in image stabilizing performance, and a camera including the same.

Means for Solving Problem

An image stabilizing device according to the present invention is an image stabilizing device for correcting image blurring attributable to movement of a camera. The image stabilizing device includes: a correction lens holding member to which a correction lens included in an optical system of the camera is fixed and that includes a rotary shaft substantially parallel to an optical axis of light entering the correction lens; a holding member that holds the correction lens holding member so that the rotary shaft is movable rectilinearly in a rectilinear direction that is an arbitrary direction in a plane orthogonal to the optical axis of light entering the correction lens and so that the correction lens holding member is rotatable about the rotary shaft in the plane; a driving portion for rectilinear movement that applies a driving force to the correction lens holding member in order to drive the correction lens holding member in the rectilinear direction; and a driving portion for rotation that applies a driving force to the correction lens holding member in order to drive the correction lens holding member in the rotation direction.

A camera according to the present invention includes: an image stabilizing unit that corrects image blurring attributable to movement of the camera; and an imaging portion that receives light that has passed through a lens group. The image stabilizing unit includes: a correction lens holding member to which a correction lens included in the lens group is fixed and that includes a rotary shaft substantially parallel to an optical axis of light entering the correction lens; a holding member that holds the correction lens holding member so that the rotary shaft is movable rectilinearly in a rectilinear direction that is an arbitrary direction in a plane orthogonal to the optical axis of light entering the correction lens and so that the correction lens holding member is rotatable in a rotation direction about the rotary shaft in the plane; a driving portion for rectilinear movement that applies a driving force to the correction lens holding member in order to drive the correction lens holding member in the rectilinear direction; and a driving portion for rotation that applies a driving force to the correction lens holding member in order to drive the correction lens holding member in the rotation direction.

Effects of the Invention

According to the present invention, it is possible to provide an image stabilizing device that can achieve miniaturization and a reduction in power consumption, while preventing a deterioration in image stabilizing performance, and a camera including the same.

DESCRIPTION OF THE INVENTION

Figure 1:
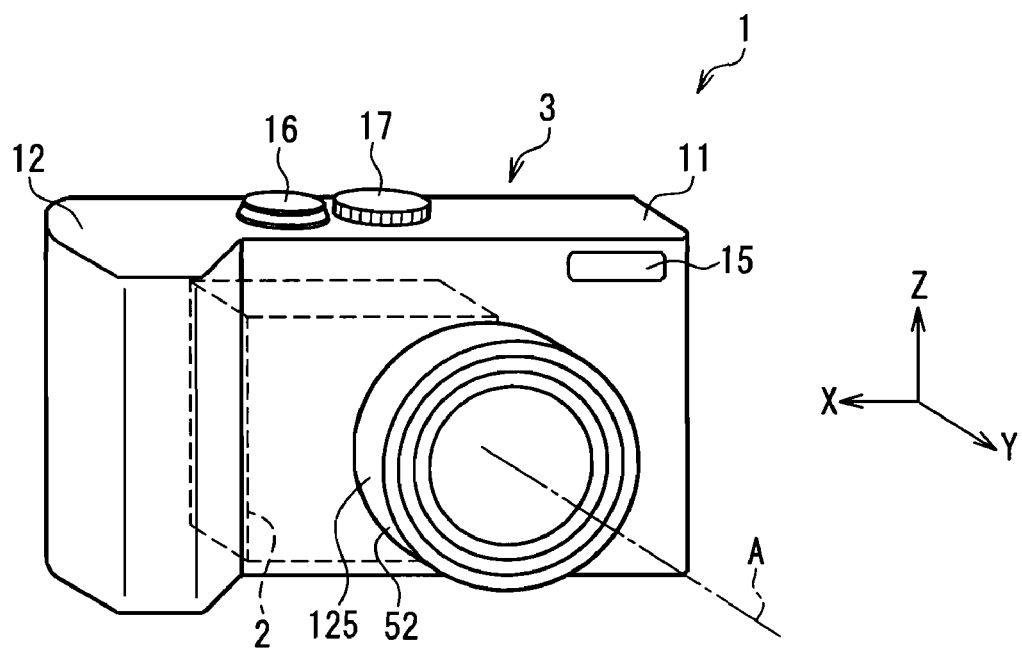
FIG. 1 is a perspective view showing an appearance of a digital camera.

An image stabilizing device for correcting image blurring attributable to movement of a camera includes: a correction lens holding member to which a correction lens included in an optical system of the camera is fixed and that includes a rotary shaft substantially parallel to an optical axis of light entering the correction lens; a holding member that holds the correction lens holding member so that the rotary shaft is movable rectilinearly in a rectilinear direction that is an arbitrary direction in a plane orthogonal to the optical axis of light entering the correction lens and so that the correction lens holding member is rotatable in a rotation direction about the rotary shaft in the plane; a driving portion for rectilinear movement that applies a driving force to the correction lens holding member in order to drive the correction lens holding member in the rectilinear direction; and a driving portion for rotation that applies a driving force to the correction lens holding member in order to drive the correction lens holding member in the rotation direction.

In this image stabilizing device, the correction lens holding member moves rectilinearly in an arbitrary direction in a plane orthogonal to an optical axis and is rotated about the rotary shaft substantially parallel to the optical axis. Therefore, there is no need for a guiding shaft that supports a correction lens holding frame so that the correction lens holding frame can be driven in a rotation direction. Thus, there is no need for shafts that perform guiding in two directions and are required for suppressing image blurring. This eliminates the need for a process and a test for securing precision in mounting the correction lens holding frame (height, position, angle, parallelism, etc.). Therefore, this image stabilizing device can achieve a reduction in dimension in a direction perpendicular to a rectilinear direction and can improve assembly processing. Thus, in the case where the image stabilizing device according to the first invention is adopted in a bending optical system, the correction lens holding frame can be disposed so that a longitudinal direction of the image stabilizing device substantially coincides with a rectilinear direction of the correction lens holding frame, thereby making it possible to incorporate an image stabilizing device also in a bending optical system.

In addition thereto, in this image stabilizing device, driving forces are applied directly to the lens holding member, to which the correction lens is fixed, from the driving portion for rectilinear movement and the driving portion for rotation, respectively. Therefore, compared with the case where driving forces of the driving portion for rectilinear movement and the driving portion for rotation do not act directly on the correction lens holding member, it is possible to prevent deterioration in the positional precision of the correction lens, and thus to prevent deterioration in the image stabilizing performance.

Being configured as above, this image stabilizing device can achieve miniaturization, while preventing a deterioration in image stabilizing performance. It also is possible to improve assemblability and to reduce a manufacturing cost.

The image stabilizing device may further have a configuration in which, the holding member has a sliding groove that is provided in an arbitrary direction in the plane orthogonal to the optical axis of entering light. The lens holding member moves rectilinearly as a result of sliding between the sliding groove and an outer peripheral portion of the rotary shaft and is rotated about the rotary shaft, thereby allowing the correction lens to move in two directions. Herein, an optical imaging element such as a CCD is attached to the lens holding member. Meanwhile, in the correction lens holding member, a groove is formed that directly restricts movement of the correction lens in the rectilinear direction. Therefore, by forming the sliding groove in parallel with either of grooves in the X- and Z-axes of the optical imaging element such as a CCD, a correction direction of the correction lens can be aligned with an axis of the optical element such as a CCD with ease and precision. This makes it possible to construct a high-precision image stabilizing device using a simple configuration and to form the image stabilizing device so that it has a reduced thickness in an optical axis direction.

The image stabilizing device may further have a configuration in which, a position detection element for rotation that detects a position of the correction lens holding member in the rotation direction further is provided. Further, the driving portion for rotation has a magnet for rotation. Further, a magnetic flux density distribution in the rotation direction of the magnet for rotation includes a usable region for rotation in which a magnetic flux density changes at substantially a constant rate. Further, when the image stabilizing device is seen from a direction along the optical axis, there exists a state where, in a region in which the correction lens holding member is movable, a detection center of the position detection element for rotation coincides with a center line of the usable region for rotation in the rotation direction. Moreover, either of the position detection element for rotation and the magnet for rotation is formed integrally with the correction lens holding member.

According to this configuration, it becomes easier for a movable area of the detection center of the position detection element for rotation to fall within a usable region of the magnet for rotation. Further, since either of the position detection element for rotation and the magnet for rotation is formed integrally with the correction lens holding member, it is possible to prevent the precision in position detection in the rotation direction from being deteriorated.

Moreover, a center of the rotary shaft of the correction lens holding member is disposed on the center line of the usable region for rotation of the position detection element for rotation, and thus the precision in position detection in the rotation direction of the correction lens holding member or the correction lens can be improved.

The image stabilizing device may further have a configuration in which, when seen from the direction along the optical axis, in the state where the detection center of the position detection element for rotation coincides with the center line of the usable region for rotation in the rotation direction, a direction of the center line of the usable region for rotation in the rotation direction substantially coincides with (is substantially parallel to) the rectilinear direction.

In this case, when the correction lens holding member is driven in the rectilinear direction, a positional shift between the detection center of the position detection element for rotation and the center line of the usable region for rotation in the rotation direction is suppressed. As a result, it becomes easier for the movable area of the detection center of the position detection element for rotation to fall within the usable region of the magnet for rotation. Thus, it is possible to prevent the precision in position detection in the rotation direction from being deteriorated due to movement in the rectilinear direction.

Herein, the case where "the center line of the usable region for rotation in the rotation direction substantially coincides with (is substantially parallel to) the rectilinear direction" refers also to, in addition to the case where the center line completely coincides with the rectilinear direction, a case where, in the state where the movable area of the detection center of the position detection element for rotation lies within the usable region of the magnet for rotation, the center line and the rectilinear direction are shifted from each other.

The image stabilizing device may further have a configuration in which, when seen from the direction along the optical axis, in a state where the optical axis of light entering the correction lens coincides with a center of the correction lens, the detection center of the position detection element for rotation substantially coincides with the center line of the usable region for rotation in the rotation direction.

In this case, in the state where the axis of light entering the correction lens coincides with the center of the correction lens, it becomes easier for the movable area of the detection center of the position detection element for rotation to fall within the usable region of the magnet for rotation. Thus, image stabilization can be performed in an area providing high precision in position detection in the rotation direction, and thus it is possible to prevent image stabilizing performance from being deteriorated.

Herein, the case where "the detection center of the position detection element for rotation substantially coincides with the center line of the usable region for rotation in the rotation direction" refers also to, in addition to the case where the detection center completely coincides with the center line, a case where, in the state where the movable area of the detection center of the position detection element for rotation lies within the usable region of the magnet for rotation, the detection center and the center line are shifted from each other.

The image stabilizing device may further have a configuration in which, when seen from the direction along the optical axis, the rotary shaft, the center of the correction lens, and the detection center of the position detection element for rotation are disposed on substantially a straight line.

In this case, when the correction lens holding member is driven in the rectilinear direction, a positional shift between the detection center of the position detection element for rotation and the center line of the usable region for rotation in the rotation direction is suppressed. As a result, it becomes easier for the movable area of the detection center of the position detection element for rotation to fall within the usable region of the magnet for rotation. Thus, it is possible to prevent deterioration in the precision in position detection in the rotation direction.

Herein, the case where "the rotary shaft, the center of the correction lens, and the detection center of the position detection element for rotation are disposed on substantially a straight line" refers also to, in addition to the case where the rotary shaft, a center of the optical axis, and the detection center are disposed on a straight line, a case where, in the state where the movable area of the detection center of the position detection element for rotation lies within the usable region of the magnet, the rotary shaft, the center of the optical axis, and the detection center are shifted from one another.

The image stabilizing device may further have a configuration in which, a position detection element for rectilinear movement that detects a position of the correction lens holding member in the rectilinear direction further is provided. Further, this configuration can be such that, when the image stabilizing device is seen from the direction along the optical axis, a line segment connecting the rotary shaft to a detection center of the position detection element for rectilinear movement substantially coincides with the rectilinear direction.

In this case, in the state where an optical axis of light entering the correction lens coincides with the center of the correction lens, it becomes easier for the movable area of the detection center of the position detection element for rectilinear movement to fall within a usable region of a magnet for rectilinear movement. Thus, image stabilization can be performed in an area providing high precision in the position detection in the rectilinear direction by the position detection element, and thus it is possible to prevent the precision in position detection from being deteriorated.

Herein, the case where "a line segment connecting the rotary shaft to the detection center of the position detection element for rectilinear movement substantially coincides with the rectilinear direction" refers also to, in addition to the case where the line segment completely coincides with the rectilinear direction, a case where, in the state where the movable area of the detection center of the position detection element for rectilinear movement lies within the usable region of the magnet for rectilinear movement, the line segment and the rectilinear direction are shifted from each other.

The image stabilizing device may further have a configuration in which, a position detection element for rectilinear movement that detects a position of the correction lens holding member in the rectilinear direction further is provided. Further, the driving portion for rectilinear movement has a magnet for rectilinear movement. Further, a magnetic flux density distribution in the rectilinear direction of the magnet for rectilinear movement includes a usable region for rectilinear movement in which a magnetic flux density changes at substantially a constant rate. Further, when the image stabilizing device is seen from the direction along the optical axis, there exists a state where, in the region in which the correction lens holding member is movable, a detection center of the position detection element for rectilinear movement coincides with a center line of the usable region for rectilinear movement in the rectilinear direction.

Thus, it becomes easier for a movable area of the detection center of the position detection element for rectilinear movement to fall within a usable region of the magnet for rectilinear movement, and thus it is possible to prevent the precision in position detection in the rectilinear direction from being deteriorated.

The image stabilizing device may further have a configuration in which, when seen from the direction along the optical axis, in the state where the optical axis of light entering the correction lens coincides with the center of the correction lens, the detection center of the position detection element for rectilinear movement substantially coincides with the center line of the usable region for rectilinear movement in the rectilinear direction.

In this case, when the correction lens holding member is driven in the rotation direction, a positional shift between the detection center of the position detection element for rectilinear movement and the center line of the usable region for rectilinear movement in the rectilinear direction is suppressed. As a result, it becomes easier for the movable area of the detection center of the position detection element for rectilinear movement to fall within the usable region of the magnet for rectilinear movement. Thus, it is possible to prevent deterioration in the precision in position detection in the rectilinear direction.

Herein, the case where "the detection center of the position detection element for rectilinear movement substantially coincides with the center line of the usable region for rectilinear movement in the rectilinear direction" refers also to, in addition to the case where the detection center completely coincides with the center line, a case where, in the state where the movable area of the detection center of the position detection element for rectilinear movement lies within the usable region of the magnet for rectilinear movement, the detection center and the center line are shifted from each other.

The image stabilizing device may further have a configuration in which, the driving portion for rotation has the magnet for rotation and a coil for rotation that is disposed so as to be opposed to the magnet for rotation. Further, when the image stabilizing device is seen from the direction along the optical axis, a distance between the rotary shaft and a center of the coil for rotation is longer than a distance between the rotary shaft and the center of the correction lens.

Generally, the correction lens is heavier than the correction lens holding member. Therefore, a center of gravity of a movable portion of the image stabilizing device is positioned in the vicinity of the center of the correction lens.

A center of the coil for rotation can be regarded as a load generation point of the driving portion for rotation. Herein, the distance between the rotary shaft and the load generation point of the driving portion for rotation is longer than the distance between the rotary shaft and the center of the correction lens. Therefore, it is possible to drive the lens holding member using a small driving force, and thus miniaturization of the driving portion for rotation and a reduction in power consumption can be achieved.

The image stabilizing device may further have a configuration in which, a position detection element for rotation that detects a position of the correction lens holding member in the rotation direction further is provided. Further, the driving portion for rotation has a magnet for rotation and a coil for rotation that is disposed so as to be opposed to the magnet for rotation. When seen from the direction along the optical axis, a distance between the rotary shaft and the detection center of the position detection element for rotation is shorter than a distance between the rotary shaft and a center of the coil for rotation.

In this case, the movable area in the rotation direction of the position detection element for rotation becomes small. As a result, it becomes easier for the movable area of the detection center of the position detection element for rotation to fall within the usable region of the magnet for rotation. Thus, it is possible to prevent deterioration in the precision in position detection in the rotation direction.

The image stabilizing device may further have a configuration in which, the rotary shaft is disposed in a region between the driving portion for rectilinear movement and the correction lens.

A portion of the correction lens holding member, to which the correction lens is fixed, is required to have a strength sufficient to hold the correction lens. Accordingly, there is always part of the correction lens holding member on the periphery of the correction lens.

Meanwhile, if the rotary shaft is disposed on the other side, the outer dimensions of the apparatus are increased by an amount determined by a portion in which the rotary shaft is formed.

Herein, the rotary shaft is disposed in the region between the driving portion for rectilinear movement and the correction lens. Therefore, a space on the periphery of the correction lens can be used effectively, and thus miniaturization of the apparatus can be achieved.

image stabilizing device may further have a configuration in which, the driving portion for rectilinear movement is disposed in a region between the rotary shaft and the correction lens.

Particularly in the case where the position detection element for rectilinear movement that detects a position of the correction lens holding member in the rectilinear direction is provided on a straight line connecting the rotary shaft to the correction lens, compared with the other arrangements, an error in the position detection for rectilinear movement that is caused due to rotation can be decreased. This allows the precision in correction in the rectilinear direction to be improved.

The image stabilizing device may further have a configuration in which, a position detection element for rectilinear movement that detects a position of the correction lens holding member in the rectilinear direction further is provided. The driving portion for rectilinear movement has a magnet for rectilinear movement and a coil for rectilinear movement that is disposed so as to be opposed to the magnet for rectilinear movement. A distance between the rotary shaft and the detection center of the position detection element for rectilinear movement is shorter than a distance between the rotary shaft and a center of the coil for rectilinear movement.

In this case, the movable area in the rotation direction of the position detection element for rectilinear movement becomes small. As a result, it becomes easier for the movable area of the detection center of the position detection element for rectilinear movement to fall within the usable region of the magnet. Thus, it is possible to secure the precision in position detection in the rectilinear direction.

The image stabilizing device may further have a configuration in which, a flexible printed board that is connected electrically to the driving portion for rotation in order to supply a voltage to the driving portion for rotation further is provided. The flexible printed board has a first fixing portion that is fixed to the correction lens holding member, a second fixing portion that is fixed to the lens holding member, and a flexible portion that couples the first fixing portion to the second fixing portion. Further, the flexible portion is disposed on a side of the rotary shaft relative to the correction lens.

In this case, a deformation amount of the flexible portion when the lens holding member moves in the rotation direction is decreased, and thus disconnection of the flexible printed board can be prevented. Further, when the deformation amount of the flexible portion is decreased, a driving force required to drive the lens holding member in the rotation direction is decreased Thus, this image stabilizing device can achieve a reduction in power consumption.

An image stabilizing device may further have a configuration in which, the correction lens is disposed in a region between the driving portion for rotation and the driving portion for rectilinear movement.

In this case, when the image stabilizing device is seen from the direction along the optical axis, the driving portion for rotation and the driving portion for rectilinear movement are disposed on both sides of the correction lens, respectively. Accordingly, the image stabilizing device has an increased length approximately in one direction. In other words, it is possible to reduce the dimension of the image stabilizing device in a direction orthogonal to a longitudinal direction. This allows an image stabilizing device to be adopted also in the case of adopting a bending optical system.

Furthermore, also in a normal optical system, since the image stabilizing device can be formed so as to have a long length in one direction, a space can be formed in a short length direction, and thus a motor for operating a shutter, an iris, or the like can be disposed in the space, thereby allowing a lens unit to be formed so as to have a reduced thickness in an optical axis direction.

An image stabilizing device may further have a configuration in which, at least three sets of supporting portions are provided. The supporting portions hold the correction lens member so that the correction lens member is movable freely in the plane orthogonal to the optical axis and restrict an inclination thereof to either side of the direction along the optical axis.

As described above, the correction lens holding member is held with respect to the lens holding member by at least three sets of supporting members provided in the lens holding member and the correction lens holding member, and thus an inclination amount of the correction lens member can be reduced.

An image stabilizing device may further have a configuration in which, a center of gravity of the correction lens holding member is disposed within a diagram formed by connecting the three sets of supporting members, and thus a pressure applied on the three sets of supporting members can be dispersed. Therefore, when the correction lens holding member is in operation, a force is applied always on the three sets of supporting members. Thus, the correction lens holding member can be held stably.

The image stabilizing device may further have a configuration in which, the center of gravity of the correction lens holding member is allowed to coincide substantially with a center of gravity of the diagram formed by connecting the supporting members, a bias load no longer is applied to the three sets of supporting members. This can suppress the occurrence of backlash/resonance, thereby allowing image stabilization to be performed stably.

The image stabilizing device may further have a configuration in which, each of the at least three supporting portions has a first supporting portion that is formed in the holding member and a second supporting portion that is formed in the correction lens holding member and can be engaged with the first supporting portion from a direction orthogonal to the rotary shaft. Further, one of the first supporting portion and the second supporting portion is a rod-like body. Further, the other of the first supporting portion and the second supporting portion is formed into a substantially U-shaped body to be engaged with the rod-like body with a predetermined gap kept between the substantially U-shaped body and the rod-like body. Further, in an engaging gap portion between the first supporting portion and the second supporting portion, grease having a consistency of 310 to 340 (JIS classification No. 1) is interposed to provide lubrication.

According to the above-described configuration, movement of the rotary member with respect to the rotary holding member in the direction along the optical axis can be restricted using a simple configuration. Further, since grease having a consistency of 310 to 340 is interposed in the predetermined gap, a damping effect can be provided by the viscosity of the grease, and thus it is possible to suppress backlash/resonance in the optical axis direction in the engaging gap portion between the first supporting portion and the second supporting portion.

The image stabilizing device may further have a configuration in which, after the correction lens holding member that holds the correction lens included in an optical system in order to perform image stabilization is assembled in the holding member, a movable area restriction member for restricting a movable area of the correction lens holding member is assembled in either of the correction lens holding member and the holding member so as to prevent the correction lens holding member from being detached from the holding member. Further, it is possible to limit the movable area of the correction lens holding member with high precision. Further, compared with the case where a movable area correction member is formed integrally with one of the correction lens holding member and the lens holding member, assembly processing can be improved.

A camera includes: a lens group that takes in light along an optical axis; an image stabilizing device; an imaging portion that receives light that has passed through the lens group; and a casing in which the lens group, the image stabilizing device, and the imaging portion are disposed. The casing holds a lens barrel.

Herein, the expression "along the optical axis" means, for example, being parallel to the optical axis. Further, as the optical system including the optical axis, in addition to a linear optical system, a bending optical system can be used. The bending optical system can be configured to include, for example, a member having a reflection surface, more specifically, a prism, a mirror, or the like. Further, the imaging portion may be formed of, for example, a CCD, a CMOS, or the like that electrically receives light with no limitation thereto, and also may be formed of a film or the like.

This camera includes the image stabilizing device according to any one of the first to twenty-first inventions and thus can achieve miniaturization while preventing deterioration in the image stabilizing performance. This camera is significantly effective particularly in reducing a dimension in the optical axis direction. Further, in this camera adopting a bending optical system, the image stabilizing device according to the present invention having a reduced dimension in a direction orthogonal to a rectilinear direction can be incorporated. This allows a dimension of the camera (thickness of the camera) to be reduced. That is, this camera achieves miniaturization and can provide a high quality image obtained as a result of correcting image blurring.

The camera may further have a configuration in which, a direction of rectilinear movement in the lens holding member of the image stabilizing device is set to be substantially a perpendicular direction with respect to a direction of gravity, so that an actuator for the rotation direction mainly is used during normal photographing, and thus power consumption of actuators can be reduced in accordance with the principle of leverage. Particularly in a camera that is capable of photographing a moving image, the effect of reducing power consumption can be enhanced.

The terms used in the above description are explained as follows.

The "detection center of the position detection element" refers to an assumed point that can be regarded as one point at which the position detection element is disposed when performing position detection. The detection center can be, for example, a point in the position detection element at which maximum detection sensitivity is attained. Generally, the detection center can be assumed to be a central point on a detection plane of the position detection element.

For example, in the case where the magnet is two-pole magnetized, the "usable region" refers to a performance guarantee area that is centered on a polarization line between N and S poles and in which a magnetic flux density changes at substantially a constant rate. Therefore, for example, in the case where the magnet is two-pole magnetized, the "center line of the usable region" refers to a boundary line on which polarity changes between the N and S poles. Examples of the state of the magnet include, in addition to the case where an N-pole portion and a S-pole portion are physically integrated with each other, the case where the N-pole portion and the S-pole portion are separated from each other physically.

The "center of the coil" refers to a center determined based on an outer shape of the coil, and, for example, in the case of a coil having the shape of substantially a quadrangle, it refers to a center of gravity of the quadrangle.

The position detection element can be, for example, a magnetic sensor utilizing a Hall effect (Hall element), a PSD (position sensitive detector), or the like.

Embodiments

[1. Outline of Present Embodiments]

Hereinafter, embodiments of the present invention will be described with reference to FIGS. 1 to 15.

The digital cameras of the present invention are characterized mainly by a configuration of the image stabilizing device. Although the following descriptions of the digital cameras according to the present embodiments are directed to a camera without a bending optical system, a bending optical system may be adopted as an optical system. That is, the digital cameras according to the present embodiments can achieve a thickness reduction, miniaturization, and a reduction in power consumption of an apparatus regardless of whether the apparatus has a configuration in which an optical system is bent or a configuration in which an optical system is not bent.

[2. Configuration of Digital Camera]

A digital camera of a first embodiment of the present invention will be described with reference to FIGS. 1 to 3.

[2-1. Specific Configuration of Digital Camera1]

FIG. 1 is a perspective view showing an appearance of a digital camera 1 of the first embodiment of the present invention.

The digital camera 1 includes an imaging apparatus 2 and a body portion 3. The imaging apparatus 2 includes an optical system that leads a light beam, which has entered along an optical axis A, to an imaging element at a fixed or freely changeable magnification. The body 3 houses the imaging apparatus 2 and performs, for example, control of the imaging apparatus 2.

Prior to describing a detailed configuration of the imaging apparatus 2, the following first describes a configuration of the body portion 3.

In the following description, six surfaces of the digital camera 1 are defined as follows.

First, a "front surface" refers to a surface facing a subject side at the time of photographing by the digital camera 1. A "back surface" refers to a surface on an opposite side of the front surface. An "upper surface" refers to a surface facing an upper side in a vertical direction in the case where photographing is performed in such a posture that upper and lower sides of a subject in the vertical direction coincide with upper and lower sides of a rectangular image captured by the digital camera 1 (generally with an aspect ratio (ratio of a long side to a short side) of 3:2, 4:3, 16:9, etc.) in its short side direction. A "bottom surface" refers to a surface on an opposite side of the upper surface. A "left side surface" refers to a surface positioned on a left side when seen from a subject side in the case where photographing is performed in such a posture that upper and lower sides of a subject in the vertical direction coincide with upper and lower sides of a rectangular image captured by the digital camera 1 in its short side direction. A "right side surface" refers to a surface on an opposite side of the left side surface. These definitions are not intended to limit the posture of the digital camera 1 when used.

Given the above-described definitions, it follows that FIG. 1 is a perspective view showing the front surface, the upper surface, and the left side surface.

Not only the six surfaces of the digital camera 1, but also six surfaces of each constituent member disposed in the digital camera 1 are defined in the same manner. That is, the above-described definitions apply to the six surface of each constituent member in a state of being disposed in the digital camera 1.

Furthermore, as shown in FIG. 1, with respect to a Y-axis parallel to the optical axis A and an erect posture of the digital camera 1, an X-axis is defined to be in a horizontal direction and a Z-axis is defined to be in a perpendicular direction. Moreover, as shown in FIG. 1, a direction toward a front surface side from a back surface side along the optical axis A is defined as a Y-axis positive direction, a direction toward a left side surface side from a right side surface side of the digital camera 1 is defined as an X-axis positive direction, and a direction toward an upper surface side from a bottom surface side of the digital camera 1 along an orthogonal axis orthogonal to the X- and Y-axes is defined as a Z-axis positive direction.

The drawings referred to in the following description are based on this XYZ coordinate system. That is, the X-axis positive direction, the Y-axis positive direction, and the Z-axis positive direction in each of the drawings are the same as those in the other drawings, respectively.

[2-2. Configuration of Body Portion]

The description is directed to a configuration of the body portion 3 with reference to FIGS. 1, 2, 3A, 3B, and 3C.

Figure 2:
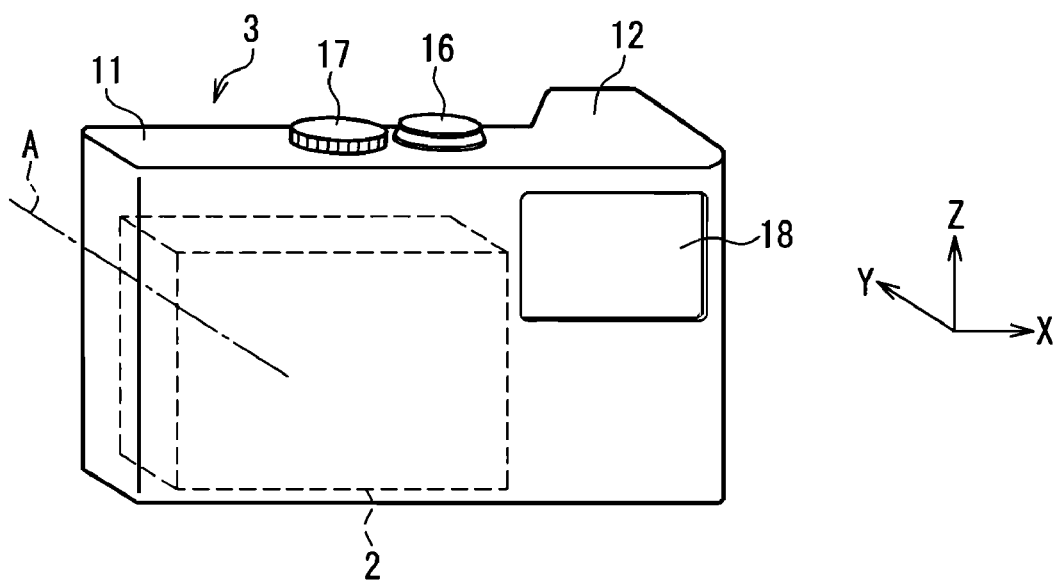
FIG. 2 is a perspective view showing the appearance of the digital camera.

FIG. 2 is a perspective view showing an appearance of the back surface, the upper surface, and the right side surface of the digital camera 1.

Figure 3A:
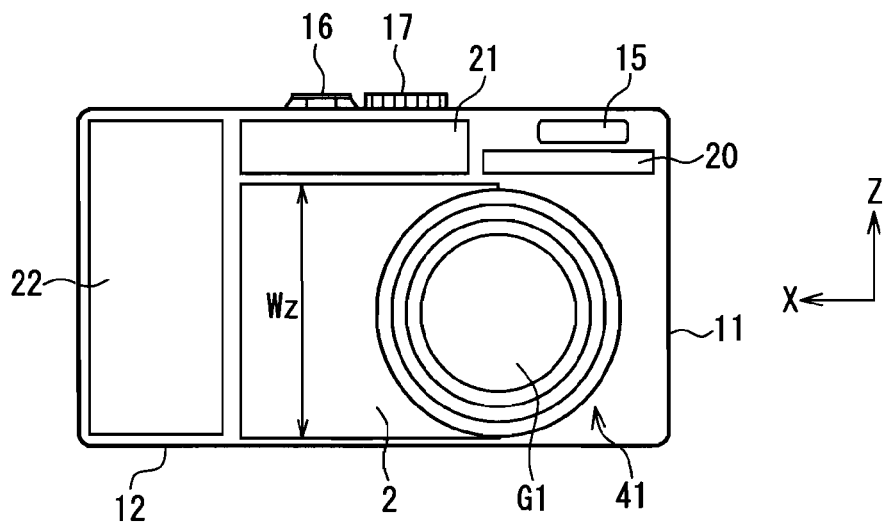
FIG. 3A is a perspective diagram schematically showing a configuration of a body portion.
Figure 3B:
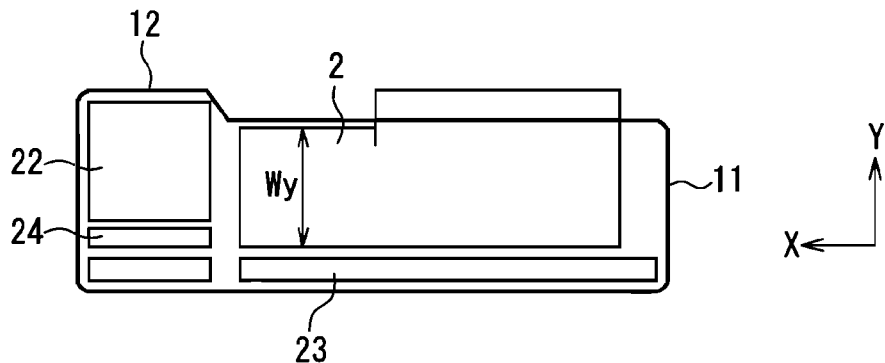
FIG. 3B is a perspective diagram schematically showing the configuration of the body portion.
Figure 3C:
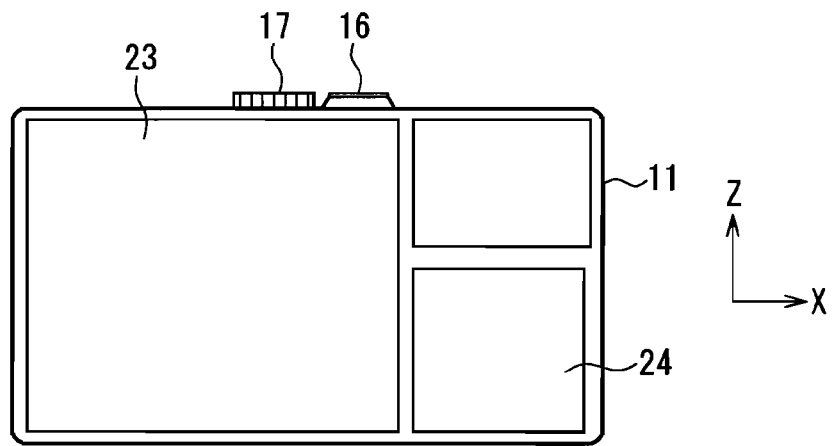
FIG. 3C is a perspective diagram schematically showing the configuration of the body portion.

FIGS. 3A to 3C are perspective diagrams schematically showing the configuration of the body portion 3. FIG. 3A is a perspective diagram showing configurations of members disposed on the positive side in the Y-axis direction (front surface side). FIG. 3B is a perspective diagram showing configurations of members disposed on the negative side in the Z-axis direction (bottom surface side). FIG. 3C is a perspective diagram showing configurations of members disposed on the negative side in the Y-axis direction (back surface side).

As shown in FIGS. 1 to 3, the body portion 3 includes a housing portion 11, a grip portion 12, a flash lamp 15, a release button 16, an operation dial 17, an image display portion 18, a main capacitor 20, a sub-substrate 21, a battery 22, and a main substrate 23. The housing portion 11 and the grip portion 12 constitute a housing that houses the imaging apparatus 2. The flash lamp 15, the release button 16, the operation dial 17, and the image display portion 18 are disposed on the surface of the housing portion 11. The main capacitor 20, the sub-substrate 21, the battery 22, and the main substrate 23 are disposed inside the housing constituted by the housing portion 11 and the grip portion 12. Further, a memory card 24 can be inserted into and removed from the body portion 3. A storage medium such as the memory card 24 may be fixed inside the body portion 3 without being limited to the configuration in which it can be inserted into and removed from the body portion 3.

As shown in FIG. 1, the housing portion 11 is a housing having substantially the shape of a rectangular solid. On the positive side in the X-axis direction of the housing portion 11, the grip portion 12 for a photographer to grip is disposed so as to protrude in the Y-axis direction from the housing portion 11. The housing portion 11 and the grip portion 12 thus constitute a hollow housing having substantially an L shape. Further, the flash lamp 15 is disposed on the front surface of the housing portion 11. As necessary, for example, when a subject is in a dark environment, the flash lamp 15 flashes so that the subject is irradiated with light to aid in performing exposure. Further, on the side of the grip portion 12 of the upper surface of the housing portion 11, the release button 16 and the operation dial 17 are disposed. The release button 16 receives a push-down operation toward the negative side in the Z-axis direction by a user. With the operation dial 17, various settings such as a setting of a photographing operation can be performed.

Moreover, as shown in FIG. 2, on the back surface of the housing portion 11, the image display portion 18 (viewing portion) is provided that allows a photographer or the like to view an image to be photographed by the imaging apparatus 2. The image display portion 18 has, for example, a rectangular outer shape with an aspect ratio (ratio of a long side to a short side) of 3:2, 4:3, 16:9, etc.

In FIGS. 1 and 2, for clarity of illustration, only principal members disposed on the surface of the housing portion 11 are depicted. Accordingly, there may be provided members other than the members that have been explained.

The description is directed next to an internal configuration of the body portion 3 with reference to FIGS. 3A to 3C.

As shown in FIG. 3A, the imaging apparatus 2 holds a lens group G1 facing a subject.

Moreover, on the positive side in the Z-axis direction of the imaging apparatus 2, the flash lamp 15, the main capacitor 20, and the sub-substrate 21 are disposed.

The main capacitor 20 applies flashing energy to the flash lamp 15 by charging from the battery 22 that will be described later. The sub-substrate 21 transforms power from the battery 22 that will be described later from one voltage to another as required. Further, the sub-substrate 21 performs control of the flash lamp 15. Further, on the positive side in the Y-axis direction inside the grip portion 12, the battery 22 as a power supply for operating the digital camera 1 is disposed.

Moreover, as shown in FIGS. 3B and 3C, on the negative side in the Y-axis direction of the imaging apparatus 2, the main substrate 23 is disposed. On the main substrate 23, an image processing circuit that processes an image signal from the imaging apparatus 2, a control circuit for controlling the imaging apparatus 2, and the like are mounted. Further, on the negative side in the Y-axis direction of the battery 22, the memory card 24 loaded in a memory card slot is disposed. The memory card 24 records an image signal from the imaging apparatus 2.

As shown in FIGS. 3A and 3B, the imaging apparatus 2 is formed so as to have a width in the Z-axis direction (Wz) larger than its width in the Y-axis direction (Wy).

[3. Configuration of Imaging Apparatus]

[3-1. Specific Configuration of Imaging Apparatus]

Figure 4:
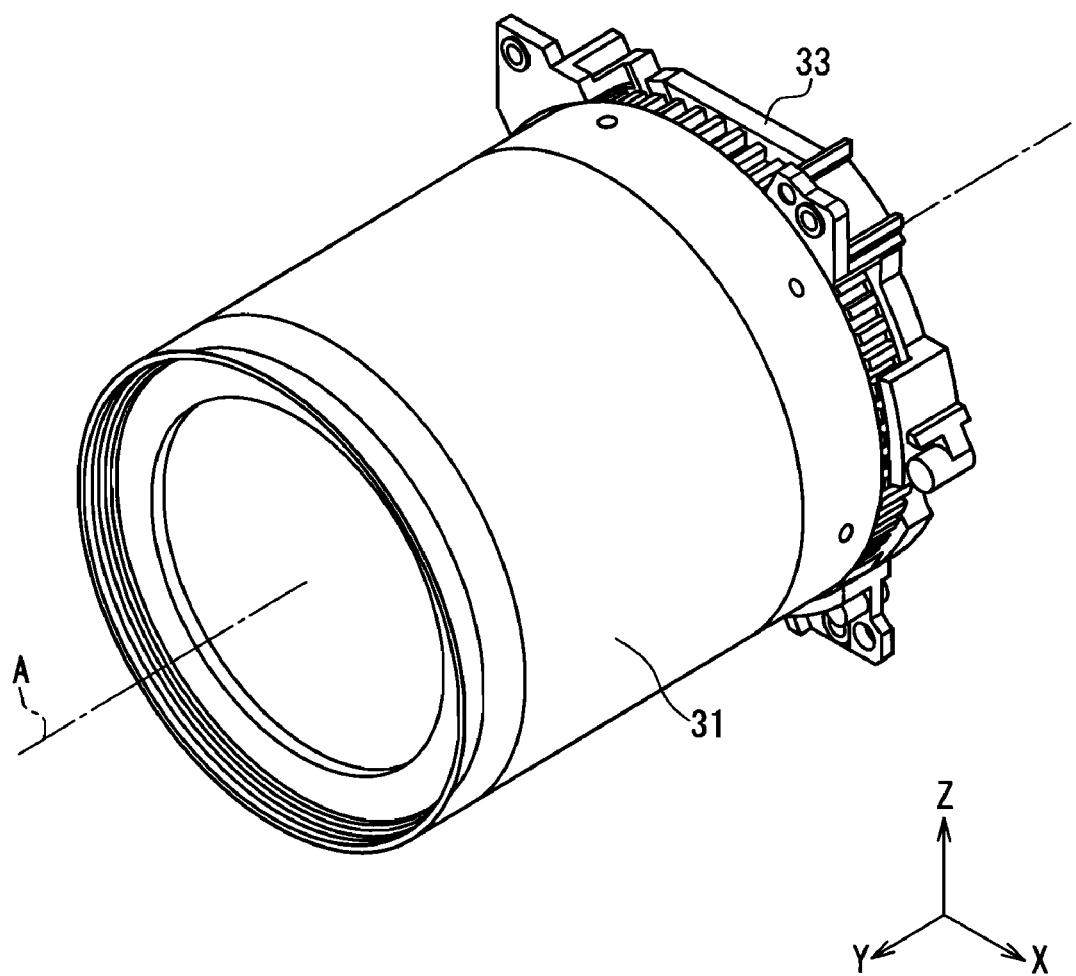
FIG. 4 is a perspective assembly view of an imaging apparatus.
Figure 5:
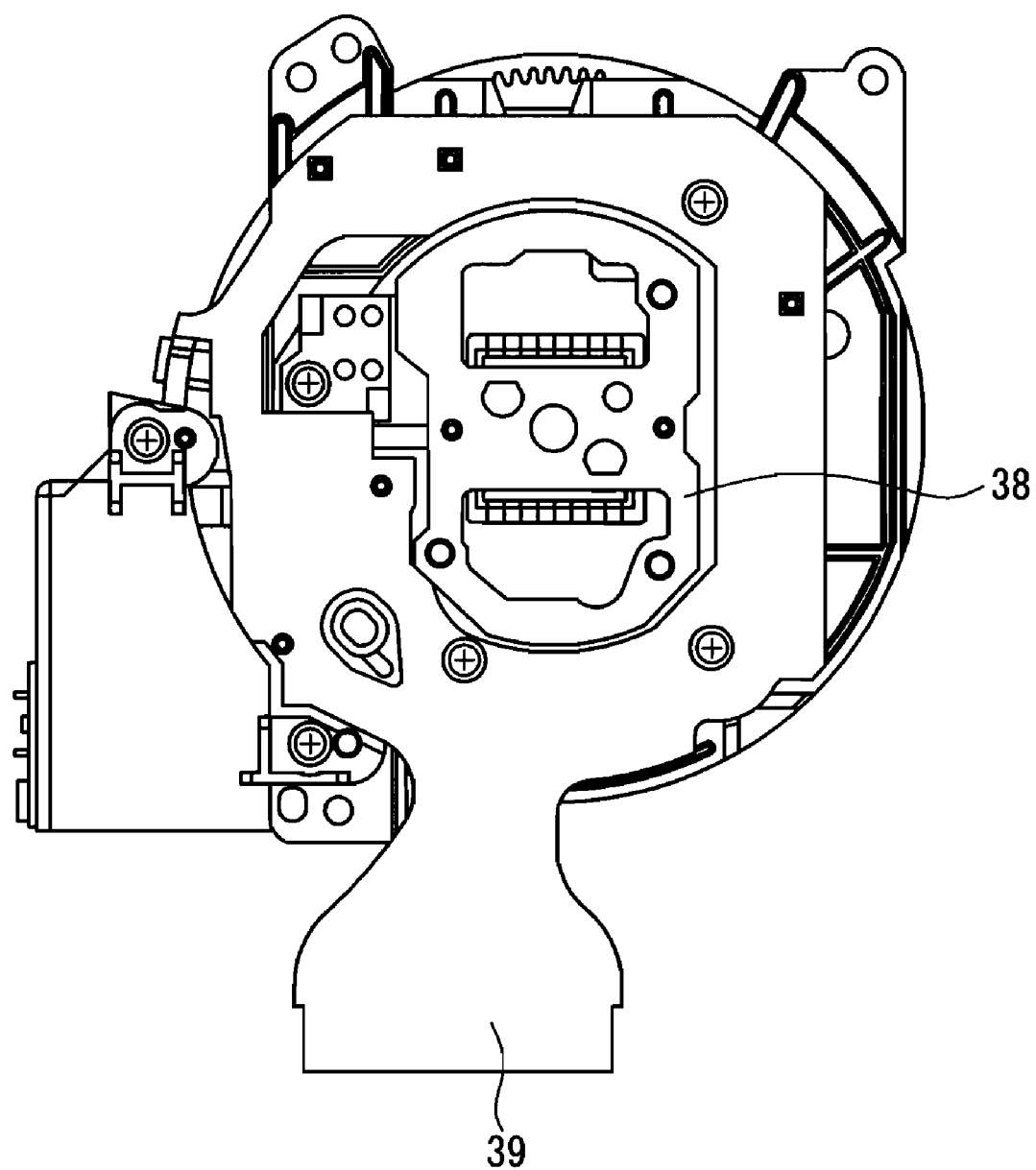
FIG. 5 is a view as seen from the side of an imaging element of the imaging apparatus.
Figure 6:
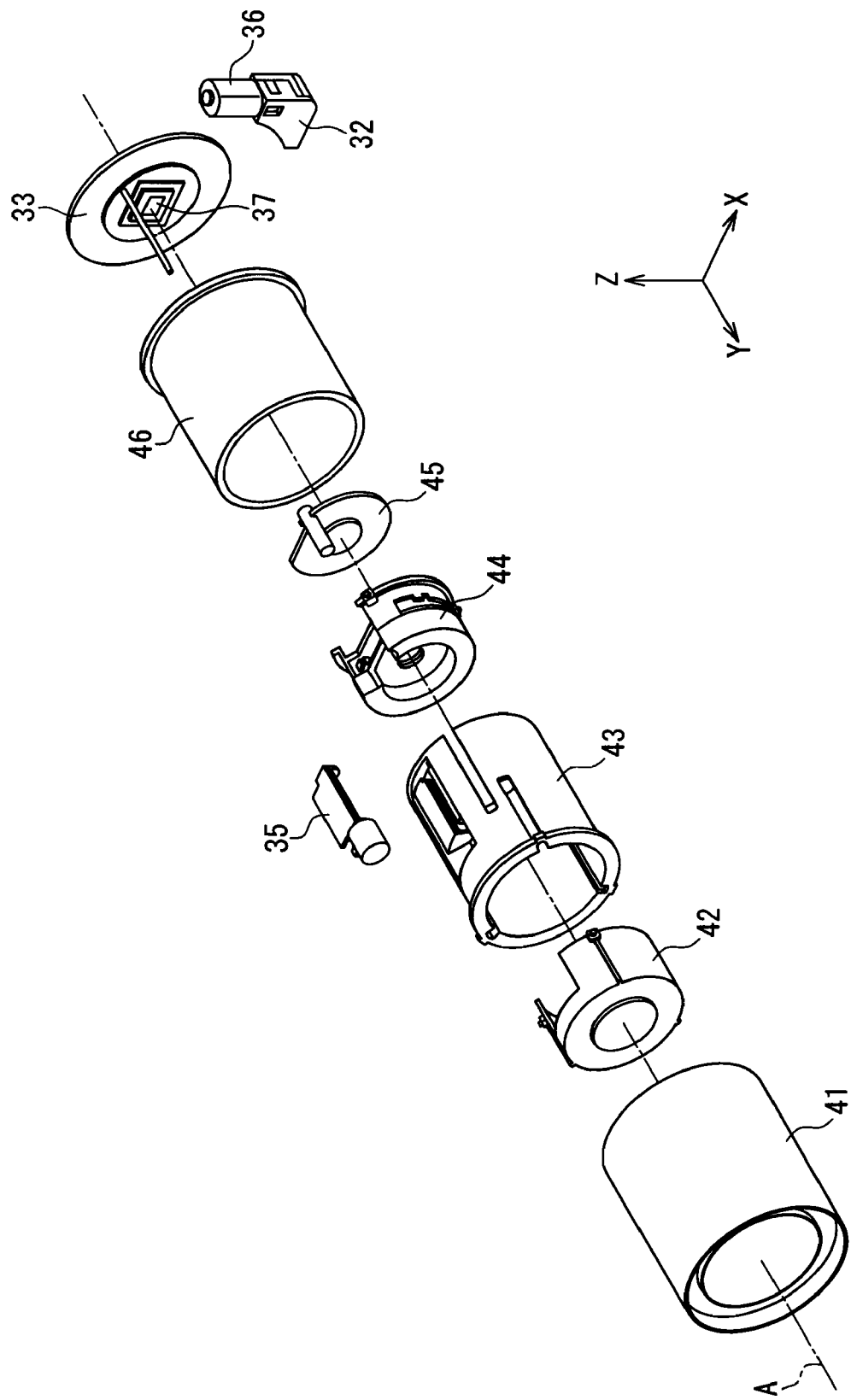
FIG. 6 is an exploded perspective view of the imaging apparatus.

The following describes a configuration of the imaging apparatus 2 incorporated in the digital camera 1 with reference to FIGS. 4, 5, and 6.

FIG. 4 is a perspective assembly view of the imaging apparatus 2. FIG. 5 is a view as seen from the side of the imaging element of the imaging apparatus 2. FIG. 6 is an exploded perspective view of the imaging apparatus 2 as seen from the same viewpoint as in FIG. 4.

The imaging apparatus 2 includes a lens barrel 31, a motor unit 32, and a master flange 33. The lens barrel 31 has an optical system. The motor unit 32 has a zoom motor 36 that drives the lens barrel 31. The master flange 33 has a CCD 37 as an imaging portion that receives a light beam that has passed through the lens barrel 31.

The motor unit 32 includes, for example, the zoom motor 36 such as a DC motor, a flexible printed board (FPC) (not shown), and a photosensor (not shown). The FPC can electrically connect the zoom motor 36 to the main substrate 23 (see FIGS. 3B, 3C). The photosensor can determine the position of a lens from an origin in the lens barrel 31 through the measurement of motor revolutions of the zoom motor 36. The zoom motor 36 drives the lens barrel 31 to move the optical system between a wide angle end and a telephoto end. Thus, the optical system included in the lens barrel 31 operates as a zoom lens system that changes a magnification at which an image of a light beam is formed on the CCD 37.

The master flange 33 includes the CCD 37, a CCD sheet metal 38, and a FPC 39. The CCD 37 can receive a light beam that has passed through the lens barrel 31 and convert it into an electric signal. The CCD sheet metal 38 allows the CCD 37 to be fixed to the lens barrel 31. The FPC 39 can electrically connect the CCD 37 to the main substrate 23 (see FIGS. 3B, 3C).

[4. Configuration of Lens Barrel]
[4-1. Specific Configuration of Lens Barrel]

The following describes a configuration of the imaging apparatus 2, mainly a configuration of the lens barrel 31, with reference to FIG. 6.

The lens barrel 31 includes a first group frame unit 41, a second group frame unit 42, an intermediate frame 43, a third group frame unit 44, and a fourth group frame unit 45. The first group frame unit 41 holds a first lens group G1. The second group frame unit 42 holds a second lens group G2. The third group frame unit 44 holds an exposure adjustment member, a shutter, and a third lens group G3. The fourth group frame unit 45 holds a fourth lens group G4. The first group frame unit 41, the second group frame unit 42, the intermediate frame 43, the third group frame unit 44, and the fourth group frame unit 45 are configured so as to be able to perform zooming and focusing operations under a collaborative operation between the intermediate frame 43 and a cam groove provided on a cam frame 46 by operations of a focus motor 35 provided in the intermediate frame 43 and the zoom motor 36 provided at the master flange 33.

[4-2. Configuration of Image Stabilizing Device]
(4-2-1. Overall Configuration of Image Stabilizing Device)

Figure 7:
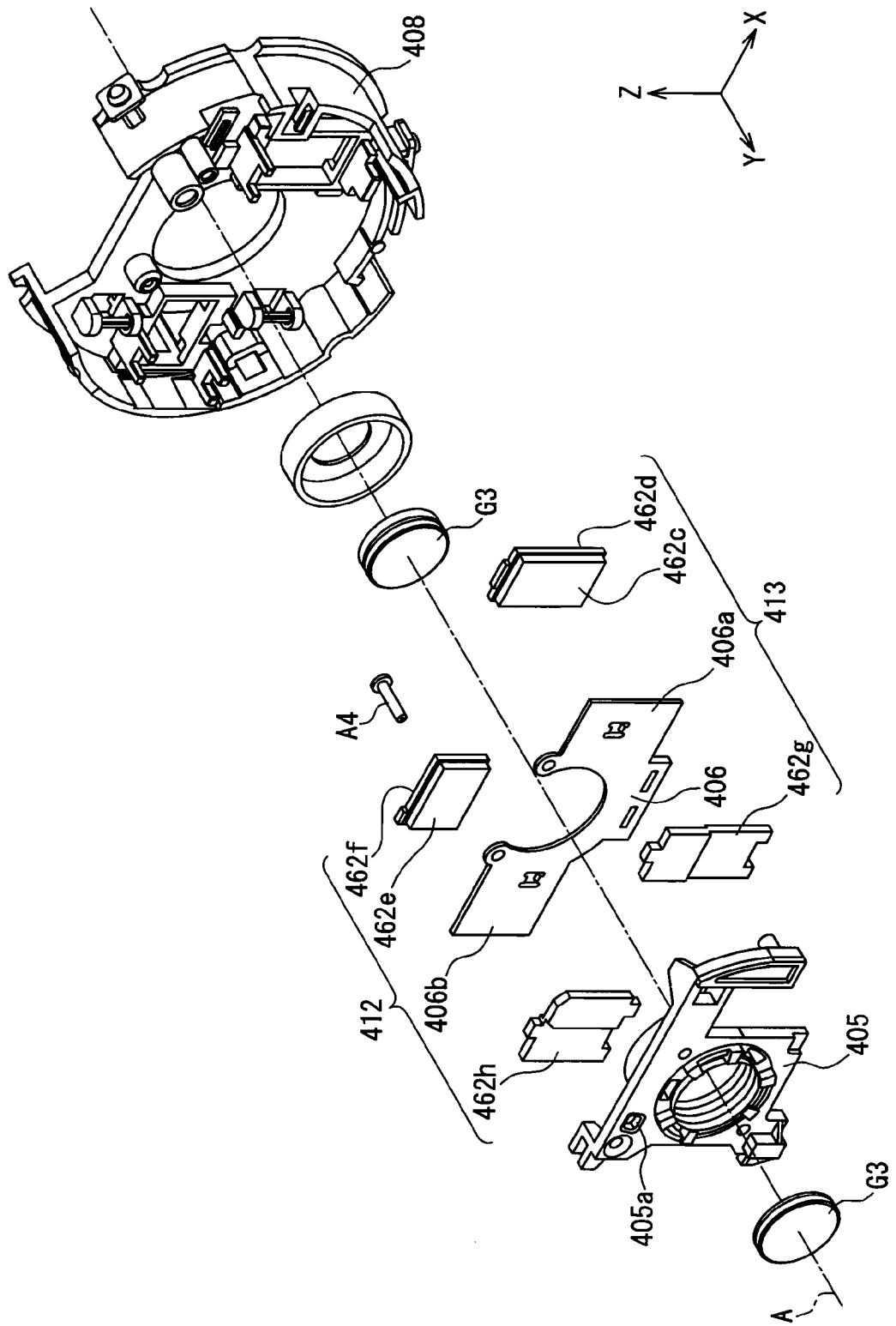
FIG. 7 is an exploded perspective view of an image stabilizing device.
Figure 8A:
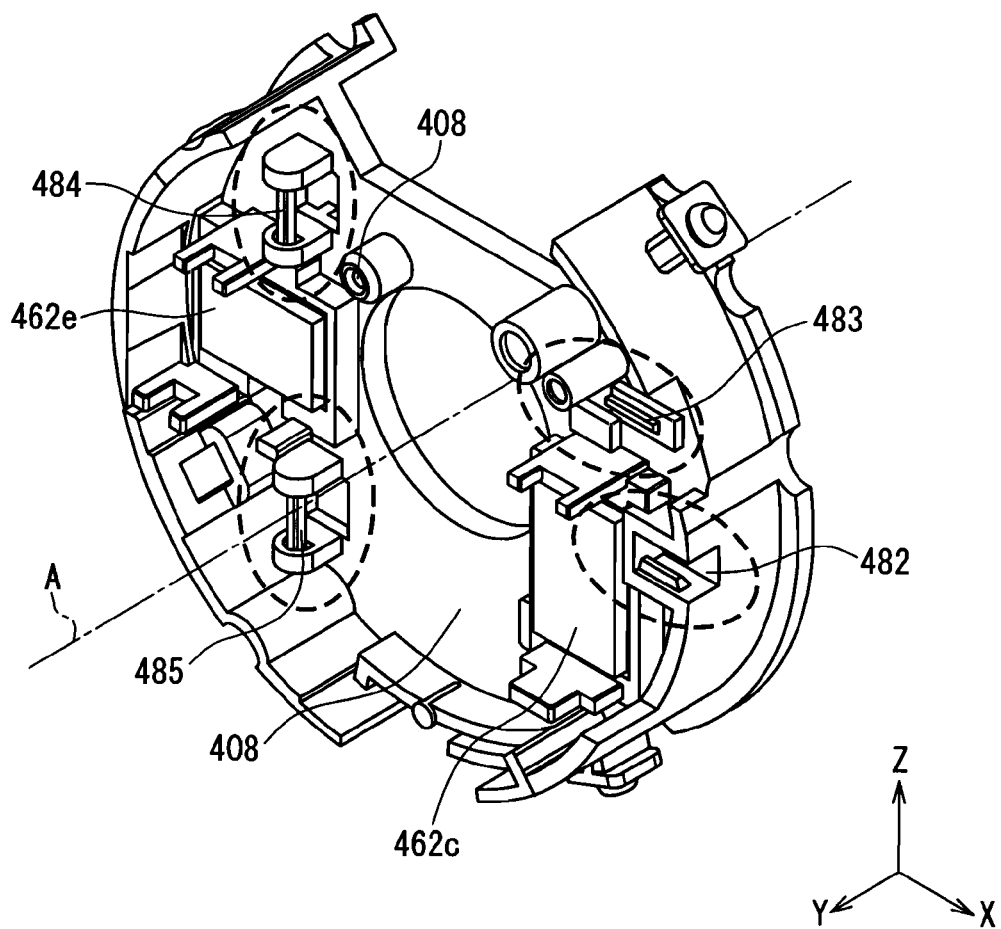
FIG. 8A is a perspective view showing a holding member and engaging portions of the image stabilizing device.
Figure 8B:
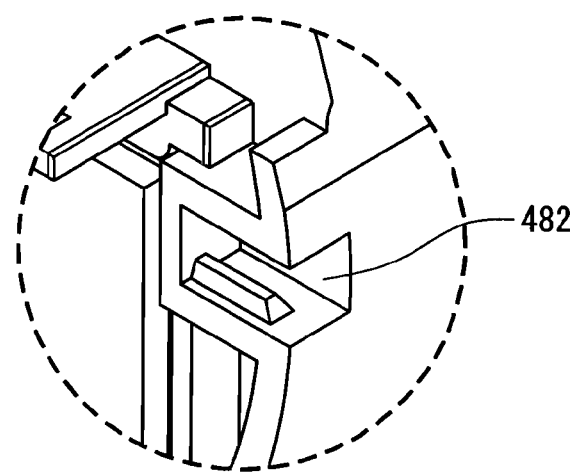
FIG. 8B is a partially enlarged perspective view showing the holding member and the engaging portion of the image stabilizing device.
Figure 8C:
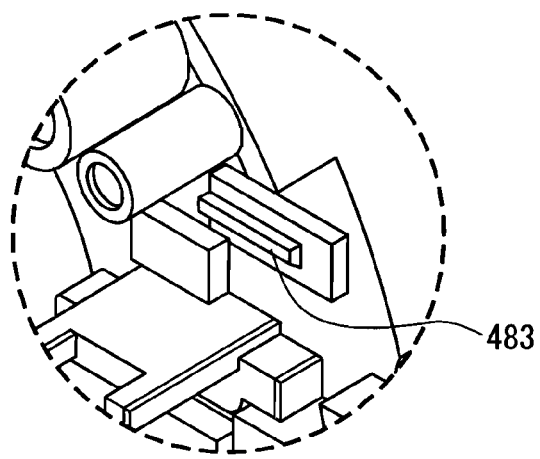
FIG. 8C is a partially enlarged perspective view showing the holding member and the engaging portion of the image stabilizing device.
Figure 8D:
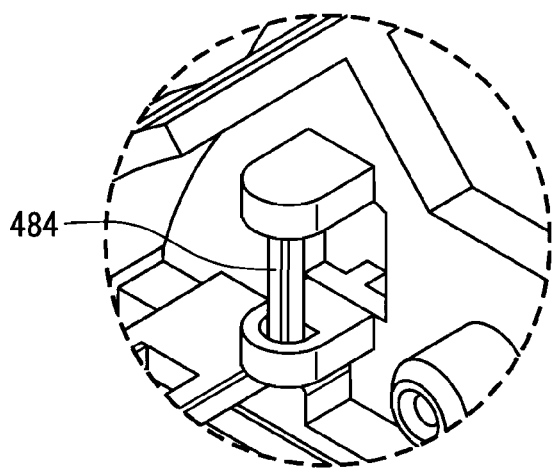
FIG. 8D is a partially enlarged perspective view showing the holding member and the engaging portion of the image stabilizing device.
Figure 8E:
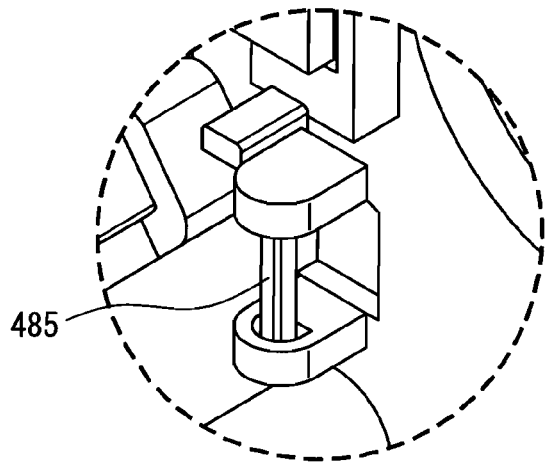
FIG. 8E is a partially enlarged perspective view showing the holding member and the engaging portion of the image stabilizing device.
Figure 9:
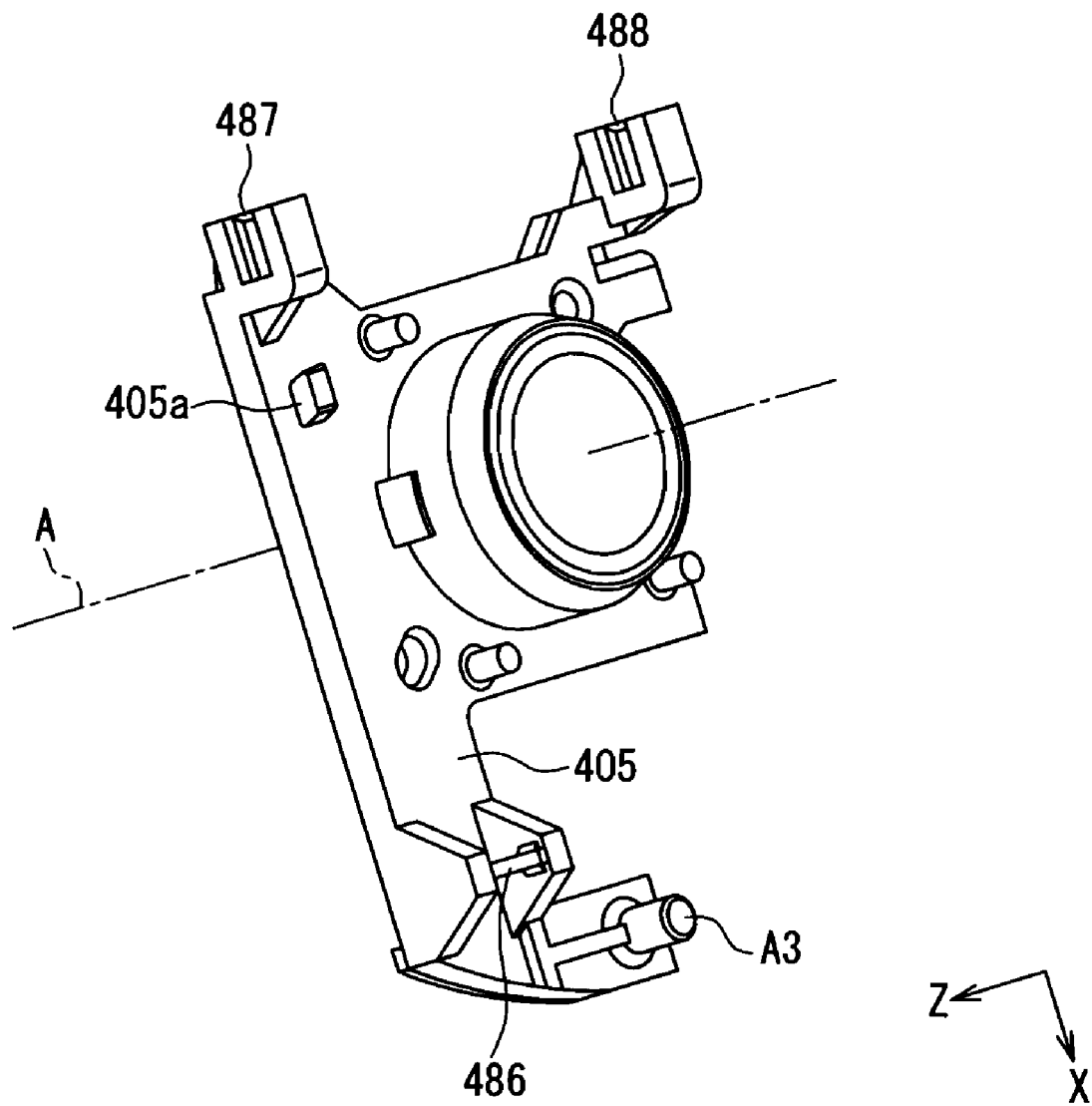
FIG. 9 is a perspective view of a correction lens holding member.
Figure 10:
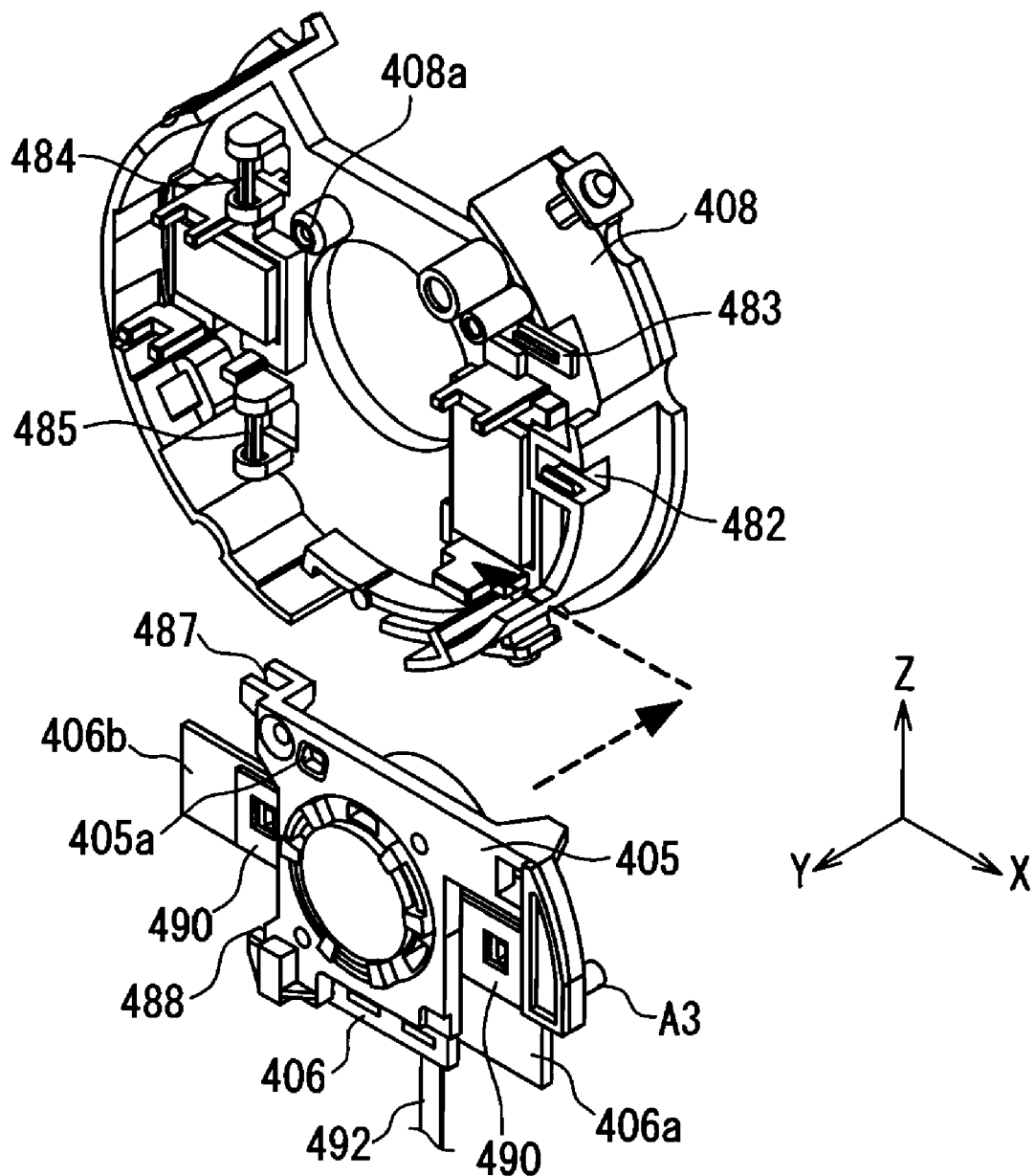
FIG. 10 is an exploded perspective view of a unit showing a positional relationship between the holding member and the correction lens holding member.
Figure 11:
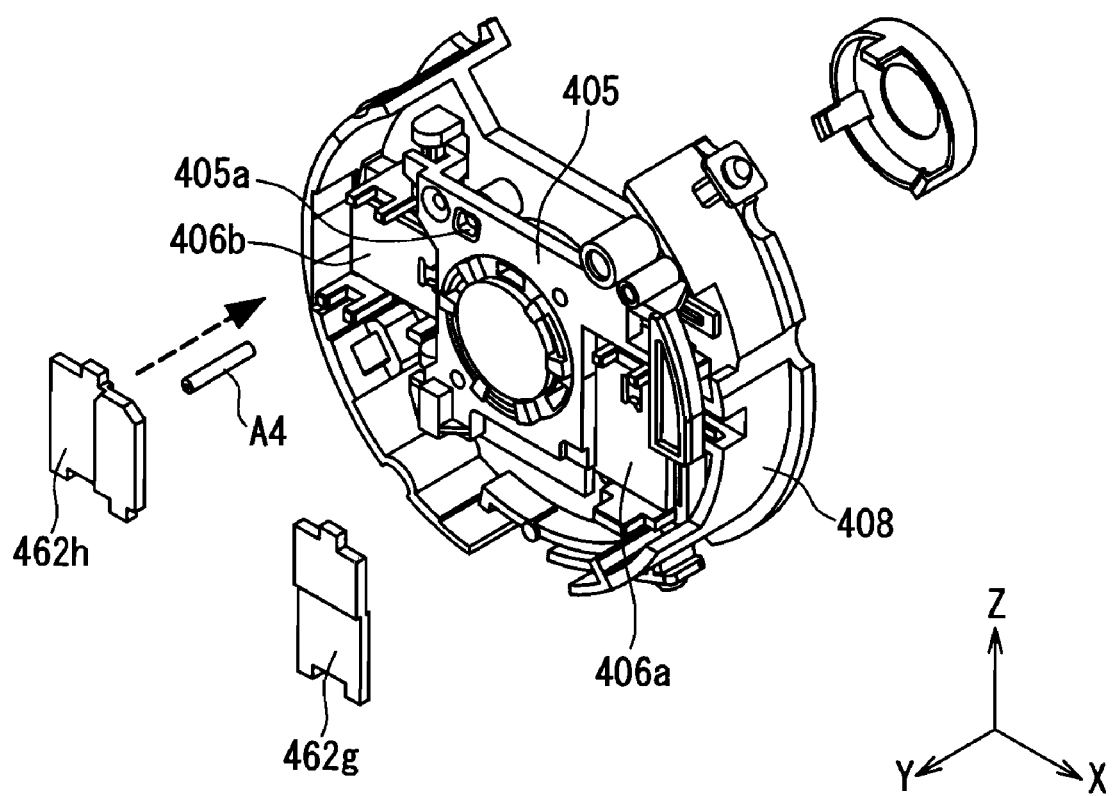
FIG. 11 is an exploded perspective view of the image stabilizing device with the correction lens holding member assembled therein.

The description is directed first to an overall configuration of an image stabilizing device 400 with reference to FIGS. 7 to 10. FIG. 7 is an exploded perspective view of the image stabilizing device 400. FIGS. 8A-8E are perspective view showing a lens holding member and engaging portions of the image stabilizing device 400. FIG. 9 is a perspective view of a correction lens holding member. FIG. 10 is an exploded perspective view of a unit showing a positional relationship between the lens holding member and the correction lens holding member. FIG. 11 is an exploded perspective view of the image stabilizing device with the correction lens holding member assembled therein.

As shown in FIG. 7, the image stabilizing device 400 includes a correction lens holding member 405, an electric substrate 406, and a lens holding member 408. The correction lens holding member 405 holds the third lens group G3. The electric substrate 406 is fixed to the correction lens holding member 405. The lens holding member 408 supports the correction lens holding member 405 so that the correction lens holding member 405 is movable linearly in a yawing direction (X-axis direction). Further, the lens holding member 408 supports the correction lens holding member 405 so that the correction lens holding member 405 is movable linearly in a pitching direction (Z-axis direction). Further, the lens holding member 408 supports the correction lens holding member 405 so that the correction lens holding member 405 is rotatable about an axis parallel to the optical axis A.

As shown in FIG. 7, the correction lens holding member 405 is supported so as to be movable in a plane orthogonal to the optical axis A, and a relative movement in the direction of the optical axis A is restricted. For this restriction, three restricting portions (supporting portions) are provided in a plane orthogonal to the X-axis. The three portions are positioned so that a center of gravity of the correction lens holding member 405 lies within a triangle formed by connecting the three portions in a X-Z plane.

Specifically, as shown in FIGS. 8 and 9, three first supporting portions 483, 484, and 485 (see FIG. 8) are provided in the lens holding member 408, and three second supporting portions 486, 487, and 488 (see FIG. 9) are provided in the correction lens holding member 405. The first supporting portion 483 has substantially a U shape open on the positive side in the X-axis direction. Each of the first supporting portions 484 and 485 has a rod-like body extending in the Z-axis direction. Meanwhile, the second supporting portions 486, 487, and 488 are disposed on the periphery of the third lens group G3. The second supporting portion 486 is a rod-like body extending in the Z-axis direction. Each of the second supporting portions 487 and 488 has a substantially U-shaped portion open on the opposite side in the X-axis direction.

As shown in FIG. 10, the first supporting portions 483, 484, and 485 are disposed in positions corresponding to the second supporting portions 486, 487, and 488, respectively. Gaps in the Y-axis direction are secured between the first supporting portions 483, 484, and 485 and the second supporting portions 486, 487, and 4.88, respectively. The second supporting portion 486 is engaged slidably with the first supporting portion 483. The second supporting portion 487 is engaged slidably with the first supporting portion 484. The second supporting portion 488 is engaged slidably with the first supporting portion 485.

Furthermore, in an engaging gap portion between each of pairs of the first supporting portion 483 and the second supporting portion 486, the first supporting portion 484 and the second supporting portion 487, and the first supporting portion 485 and the second supporting portion 488, grease (not shown) having a consistency of 310 to 340 is interposed to provide lubrication.

The correction lens holding member 405 further has a rotary shaft A3. Meanwhile, the lens holding member 408 has a sliding groove 482 extending linearly in the yawing direction (X-axis direction). The rotary shaft A3 is formed so as to have a diameter smaller than a groove width of the sliding groove 482 and is slidably and rotatably engaged with the sliding groove 482.

Similarly, in an engaging gap portion between the rotary shaft A3 and the sliding groove 482, grease (not shown) having a consistency of 310 to 340 is interposed to provide lubrication.

Herein, the "pitching direction" refers to a direction along an arc about the rotary shaft A3 (rotation direction), and the "yawing direction" refers to the X-axis direction (rectilinear direction).

Moreover, as shown in FIG. 11, an electromagnetic actuator for rotation 412 (see FIG. 7) for driving in the rotation direction is composed of a yoke 462f, a magnet for rotation 462e (see FIG. 8A), a coil for rotation 406b, and an opposed yoke 462h. The yoke 462f is fixed to the lens holding member 408. The magnet for rotation 462e is fixed to the yoke 462f and is two-pole magnetized in the Z-axis direction. The coil for rotation 406b is fixed to the correction lens holding member 405. The coil for rotation 406b is energized, and thus an electromagnetic power Fp in the pitching direction is generated.

Meanwhile, an electromagnetic actuator for rectilinear movement 413 (see FIG. 7) for driving in the rectilinear direction is composed of a yoke 462d (see FIG. 8), a magnet for rectilinear movement 462c, a coil for rectilinear movement 406a, and an opposed yoke 462g. The yoke 462d is fixed to the lens holding member 408. The magnet for rectilinear movement 462c is fixed to the yoke 462d and is two-pole magnetized in the X-axis direction. The coil for rectilinear movement 406a is fixed to the magnet for rotation 462c and to the correction lens holding member 405. The coil for rectilinear movement 406a is energized, and thus an electromagnetic power Fy in the yawing direction is generated.

On the positive side in the X-axis direction of the coil 406b, a Hall element 406d (position detection element for rotation) for detecting a magnetic flux of the magnet 462e so as to detect the position of the correction lens holding member 405 in the Z-axis direction is disposed. The Hall element 406d uses the magnet 462e that is used also by the electromagnetic actuator for rotation 412.

Similarly, on the positive side in the Z-axis direction of the coil 406a, a Hall element 406c (position detection element for rectilinear movement) for detecting a magnetic flux of the magnet 462c so as to detect the position of the correction lens holding member 405 in the X-axis direction is disposed. The Hall element 406c uses the magnet 462c that is used also by the electromagnetic actuator for rectilinear movement 413.

With respect to the electromagnetic actuator for rotation 412, the third lens group G3 is disposed on a side opposite to the side on which it is disposed with respect to the electromagnetic actuator for rectilinear movement 413. In other words, the third lens group G3 is disposed in a region between the electromagnetic actuator for rotation 412 and the electromagnetic actuator for rectilinear movement 413. The planar arrangement of the constituent portions will be detailed later.

Furthermore, as shown in FIG. 10, the correction lens holding member 405 further has a flexible printed board 490 for supplying a voltage to the electric substrate 406. The flexible printed board 490 is connected electrically to the electric substrate 406.

[4-2-2. Positional Relationships among Portions of Image Stabilizing Device 400]

Figure 12:
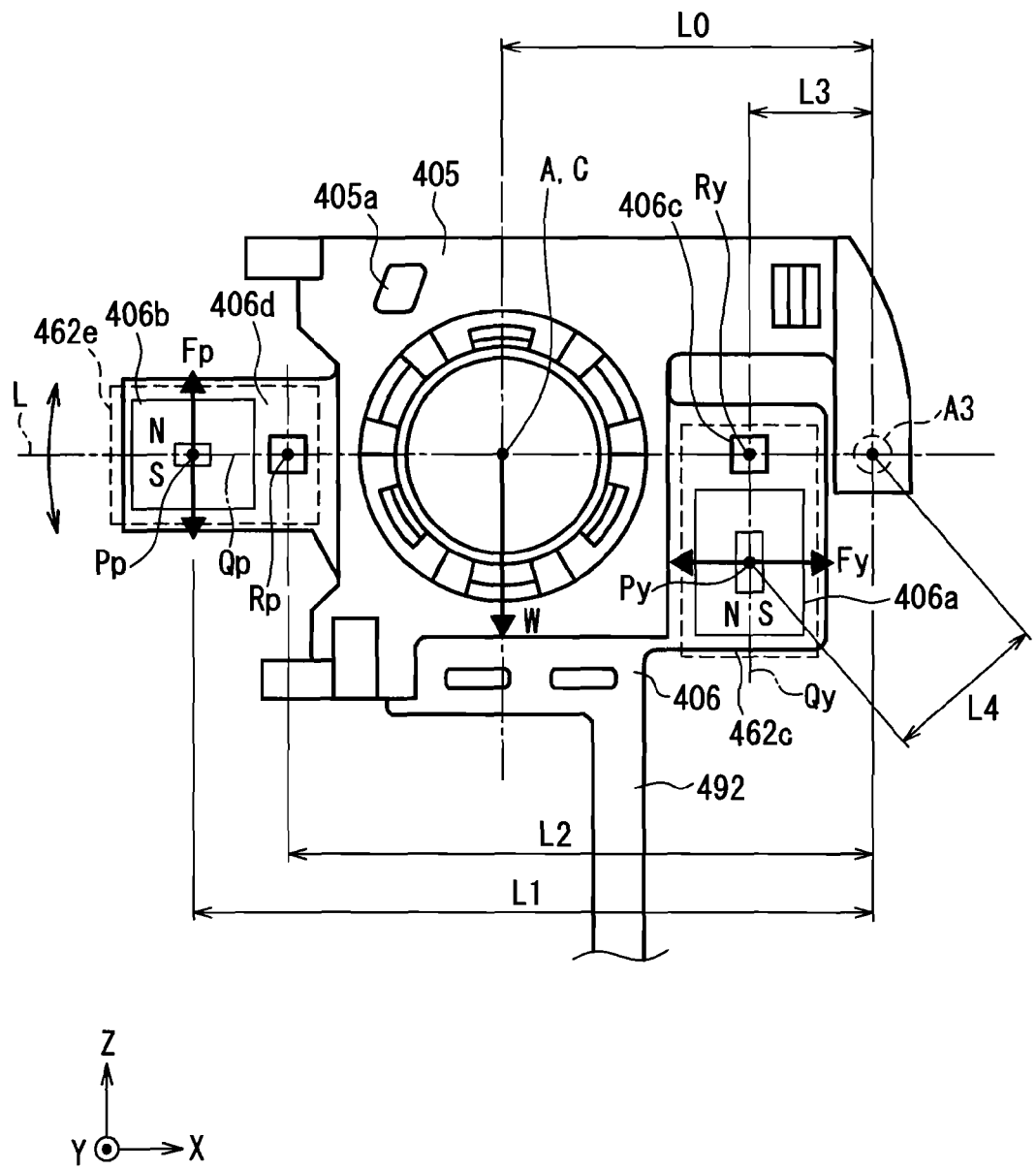
FIG. 12 is a schematic plan view of the correction lens holding member and an electric substrate as seen from a positive side in a Y-axis direction.

Furthermore, the image stabilizing device 400 is characterized also by positional relationships among portions thereof. The following describes in detail the positional relationships among the portions with reference to FIGS. 12 and 13. FIG. 12 is a schematic plan view of the correction lens holding member 405 and the electric substrate 406 as seen from the positive side in the Y-axis direction. FIG. 13 is a diagram for explaining a magnet usable region and a Hall element performance guarantee area. FIG. 12 shows a state where the optical axis A coincides with a center C of the third lens group G3, that is, a state where the third lens group G3 is positioned in the vicinity of a center of a region in which the third lens group G3 is movable.

As shown in FIG. 12, in the state where the optical axis A coincides with the center C of the third lens group G3, the Hall elements 406c and 406d and a center Pp of the coil 406b of the image stabilizing device 400 are disposed in a plane including the rotary shaft A3 and the center C of the third lens group G3. That is, in a region in which the correction lens holding member 405 is movable, the rotary shaft A3, the center C of the third lens group G3, the Hall elements 406c and 406d, and the center Pp of the coil 406b are disposed on a straight line L extending in the X-axis direction.

Herein, the center Pp of the coil 406b refers to a central point of action of a load generated by a collaborative operation between the coil 406b and the magnet 462e when the coil 406b is energized. The same explanation as that of the center Pp applies to a center Py of the coil 406a.

In the region in which the correction lens holding member 405 is movable, there exists a state where a detection center Rp of the Hall element 406d coincides with a polarization line Qp of the magnet 462e. In the state where the detection center Rp of the Hall element 406d coincides with the polarization line Qp of the magnet 462e, the polarization line Qp of the magnet 462e is in a direction that substantially coincides with the yawing direction (X-axis direction). Moreover, as shown in FIG. 12, in the state where the optical axis A coincides with the center C of the third lens group G3, the detection center Rp of the Hall element 406d substantially coincides with the polarization line Qp of the magnet 462e.

Furthermore, in the state shown in FIG. 12, the rotary shaft A3, the center C of the third lens group G3, and a detection center Ry of the Hall element 406c are disposed approximately on the straight line L. Mine segment connecting the rotary shaft A3 to the detection center Ry of the Hall element 406c substantially coincides with the yawing direction (X-axis direction).

As shown in FIG. 12, a distance L1 between the rotary shaft A3 and the center Pp of the coil 406b is longer than a distance IA between the rotary shaft A3 and the center C of the third lens group G3. A distance L2 between the rotary shaft A3 and the detection center Rp of the Hall element 406d is shorter than the distance L1 between the rotary shaft A3 and the center Pp of the coil 406b. A distance L3 between the rotary shaft A3 and the detection center Ry of the Hall element 406c is shorter than a distance L4 between the rotary shaft A3 and the center Py of the coil 406a.

Meanwhile, as shown in FIG. 12, in the region in which the correction lens holding member 405 is movable, there exists a state where the detection center Ry of the Hall element 406c coincides with a polarization line Qy of the magnet 462c. In the state where the optical axis A coincides with the center C of the third lens group G3, the detection center Ry of the Hall element 406c substantially coincides with the polarization line Qy of the magnet 462c.

In the state shown in FIG. 12, the polarization line Qp and the straight line L are substantially orthogonal to the direction of the electromagnetic force Fp generated in the electromagnetic actuator 412. That is, in the state shown in FIG. 12, a plane including a point of action of the electromagnetic force Fp and the rotary shaft A3 is substantially orthogonal to directions in which the electromagnetic force acts.

Figure 13A:
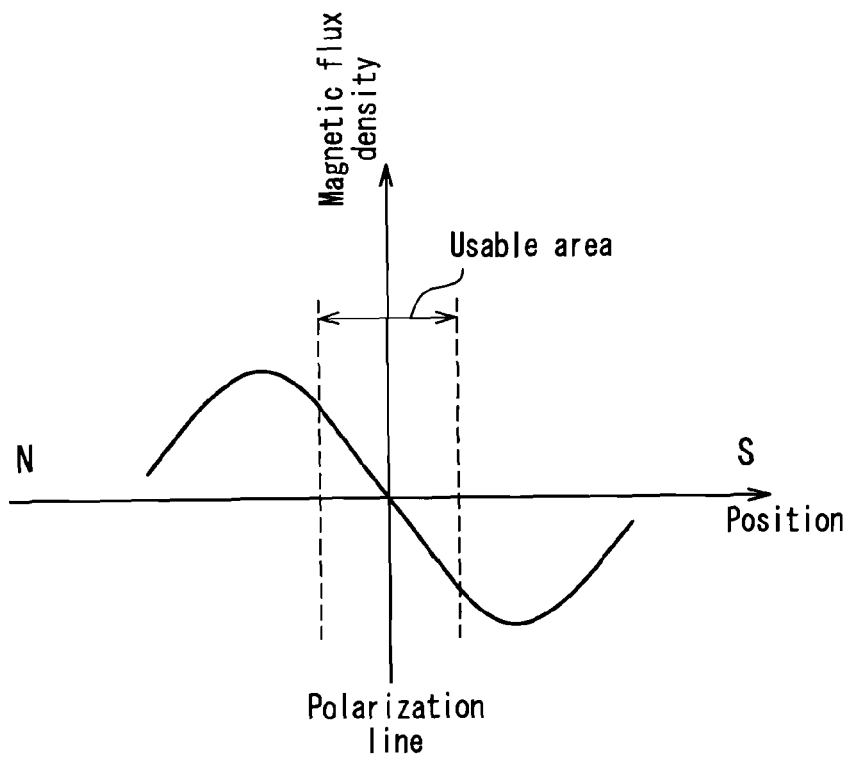
FIG. 13A is a diagram for explaining a magnet usable region and a Hall element performance guarantee area.

Herein, the "detection center of the Hall element" refers to an assumed point that can be regarded as one point at which the Hall element is disposed when performing position detection. The detection center can be, for example, a point in the Hall element at which maximum detection sensitivity is attached. Generally, the detection center can be assumed to be a central point on a detection plane of the Hall element. The "polarization line of the magnet" refers to a boundary line on which the polarity changes between the N and S poles. As shown in FIG. 13A, a magnetic flux density distribution of the magnet includes a usable region centered on the polarization line, in which a magnetic flux density changes at substantially a constant rate. The usable region refers to an area that can be used for position detection, and in the usable region, a measurement value of the Hall element changes with a measurement position substantially linearly, thus allowing position detection to be performed with accuracy.

Figure 13B:
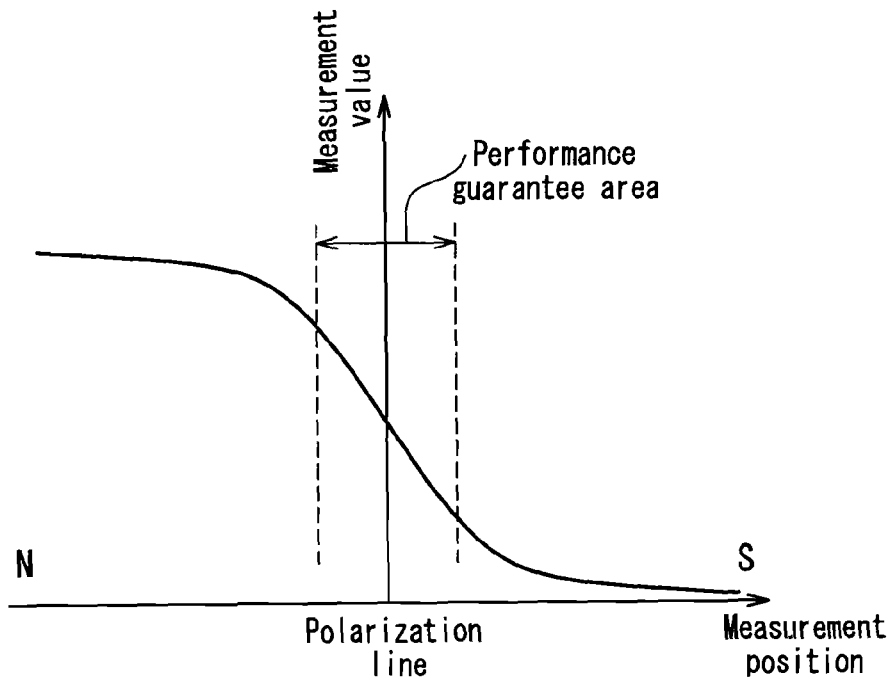
FIG. 13B is a diagram for explaining the magnet usable region and the Hall element performance guarantee area.

For example, as shown in FIG. 13B, in the magnet usable region, when a relative position (measurement position) between the Hall element and the magnet changes, the measurement value (output) of the Hall element changes with a change in the relative position substantially linearly. Thus, based on the output of the Hall element, a relative position of the Hall element with respect to the magnet can be determined with accuracy. That is, the magnet usable region corresponds to the performance guarantee area with regard to position detection. When a movable area of the Hall element lies within this performance guarantee area, the Hall element can endure the use as a position detection element for image stabilization.

In the case of the image stabilizing device 400, a magnetic flux density distribution in the yawing direction (X-axis direction) of the magnet for rectilinear movement 462c includes a usable region centered on the polarization line Qy. A magnetic flux density distribution in the pitching direction (Z-axis direction) of the magnet for rotation 462e includes a usable region centered on the polarization line Qp. A movable area of the detection center Ry of the Hall element 406c is set so as to lie within the usable region of the magnet 462c. A movable area of the detection center Rp of the Hall element 406d is set so as to lie within the usable region of the magnet 462e.

[4-2-3. Method of Assembling Image Stabilizing Device 400]

Figure 14A:
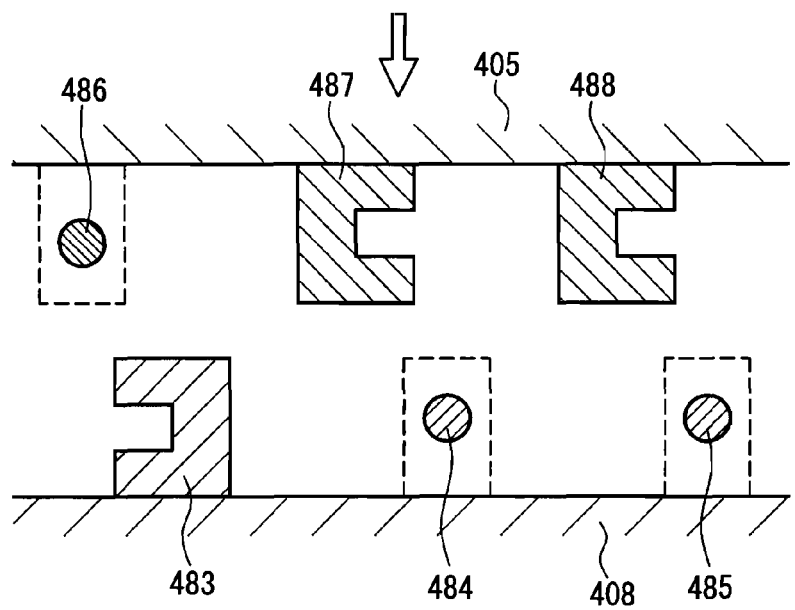
FIG. 14A is a diagrammatic view showing an engaged state between first supporting portions and second supporting portions.
Figure 14B:
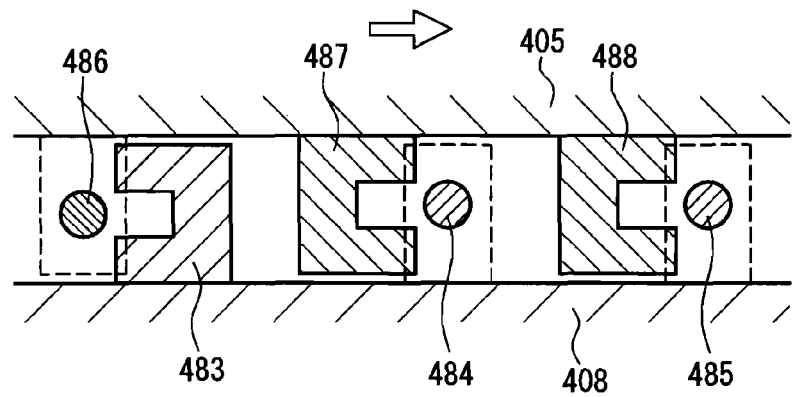
FIG. 14B is a diagrammatic view showing the engaged state between the first supporting portions and the second supporting portions.
Figure 14C:
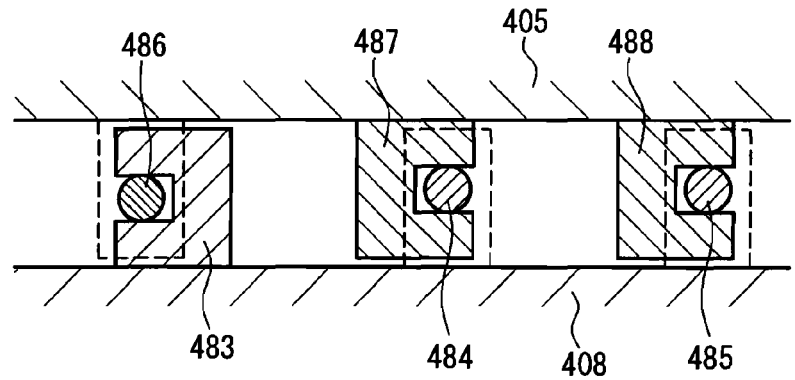
FIG. 14C is a diagrammatic view showing the engaged state between the first supporting portions and the second supporting portions.

The image stabilizing device 400 is characterized further by its assembling method. The following describes the method of assembling the image stabilizing device 400 with reference to FIGS. 10, 11, 14A, 14B, and 14C. FIGS. 14A, 14B, and 14C are diagrammatic views showing engaged states between the first supporting portions and the second supporting portions.

As shown in FIG. 10, first, the correction lens holding member 405 is fitted to the surface of the lens holding member 408 on the positive side in the Y-axis direction. At this time, as shown in FIGS. 14A and 14B, the first supporting portions 487 and 488 of the correction lens holding member 405 are inserted into spaces on the peripheries of the second supporting portions 484 and 485 of the lens holding member 408, respectively, and the second supporting portion 483 is inserted into a space on the periphery of the first supporting portion 486.

Next, as shown in FIG. 10, the correction lens holding member 405 is slid to the negative side in the X-axis direction with respect to the lens holding member 408. As a result of this, as shown in FIG. 14C, shaft portions of the second supporting portions 484 and 485 are inserted into the substantially U-shaped first supporting portions 487 and 488, respectively, and a shaft portion of the first supporting portion 486 is inserted into the substantially U-shaped second supporting portion 483.

At the same time, the shaft A3 of the correction lens holding member 405 is inserted into the sliding groove 482 of the lens holding member 408.

Further, as shown in FIG. 8, in the lens holding member 408, a boss portion 408a is provided, into which a shaft A4 for restricting amounts of movement of the correction lens holding member 405 in the pitching direction and in the yawing direction on the X-Z plane is to be pressed. Meanwhile, as shown in FIGS. 9, 10, 11, and 12, in the correction lens holding member 405, a hole portion 405a is provided in a position opposed to the boss portion 408a. The hole portion 405a has a shape able to collaborate with the shaft A4 in restricting amounts of movement of the correction lens holding member 405 in the pitching direction and in the yawing direction.

Thus, after the correction lens holding member 405 is mounted to the lens holding member 408, the movement amount restriction shaft A4 is threaded through the hole portion 405a of the correction lens holding member 405 from the positive side in the Y-axis direction so as to be pressed into or fixed by adhesion to the boss portion 408a of the lens holding member 408.

As described above, the correction lens holding member 405 and the lens holding member 408 are engaged with each other by the first supporting portions 486, 487, and 488 and the second supporting portions 483, 484, and 485, thus forming a configuration in which movement of the correction lens holding member 405 in the Y direction is restricted, and, on the X-Z plane, the correction lens holding member 405 is rotatable about the rotary shaft A3 and is movable rectilinearly in the X direction. That is, unlike the conventional image stabilizing device, for example, there is no need to fix both ends of each of a yawing shaft and a pitching shaft by adhesion to a holding frame.

[5. Effect]

The image stabilizing device 400 described above provides the following effect.

(1). In the image stabilizing device 400, the correction lens holding member 405 is driven in the pitching direction (rotation direction) about the rotary shaft A3 with respect to the lens holding member 408. Further, the rotary shaft A3 is driven along the groove of the sliding groove 482 provided in the lens holding member 408 in the yawing direction (in the rectilinear direction). This eliminates the need for shafts for guiding in the pitching direction and in the yawing direction. Thus, a reduction in the dimension in the perpendicular Z-axis direction, the pitching direction, can be achieved.

(2). In the image stabilizing device 400, in the state where the detection center Rp of the Hall element 406d coincides with the polarization line Qp of the magnet 462e, the polarization line Qp of the magnet 462e is in a direction that substantially coincides with the yawing direction (rectilinear direction). Therefore, when the correction lens holding member 405 is driven in the yawing direction, a positional shift in the yawing direction (rectilinear direction) between the detection center Rp of the Hall element 406d and the polarization line Qp of the magnet 462e is suppressed. As a result, it becomes easier for the movable area of the detection center Rp of the Hall element 406d to fall within the usable region of the magnet 462e. Thus, it is possible to prevent deterioration of the precision in position detection in the yawing direction due to movement in the pitching direction.

Herein, the case where "the polarization line Qp of the magnet 462e is in a direction that substantially coincides with the yawing direction (X-axis direction)" refers also to, in addition to the case where the polarization line Qp completely coincides with the yawing direction, a case where, in the state where the movable area of the detection center Rp of the Hall element 406d lies within the usable region of the magnet 462e, the polarization line Qp and the yawing direction are shifted from each other.

(3). In the image stabilizing device 400, in the state where the center C of the third lens group G3 coincides with the optical axis A, the detection center Rp of the Hall element 406d substantially coincides with the polarization line Qp of the magnet 462e. Therefore, in the state where the center C of the third lens group G3 coincides with the optical axis A, it becomes easier for an area of the detection center Rp of the Hall element 406d to fall within the usable region of the magnet 462e. Thus, it is possible to prevent deterioration of the precision in position detection in the yawing direction.

Herein, the case where "the detection center Rp of the Hall element 406d substantially coincides with the polarization line Qp of the magnet 462e" refers also to, in addition to the case where the detection center Rp completely coincides with the polarization line Qp, a case where, in the state where the movable area of the detection center Rp of the Hall element 406d lies within the usable region of the magnet 462e, the detection center Rp and the polarization line Qp are shifted from each other.

(4). In the image stabilizing device 400, the rotary shaft A3, the center C of the third lens group G3, and the detection center Rp of the Hall element 406d are disposed approximately on the straight line L. Therefore, when the correction lens holding member 405 is driven in the yawing direction, a positional shift between the detection center Rp of the Hall element 406d and the polarization line Qp of the magnet 462e is suppressed. As a result, it becomes easier for the movable area of the detection center Rp of the Hall element 406d to fall within the usable region of the magnet 462e. Thus, it is possible to prevent deterioration of the precision in position detection in the yawing direction.

Herein, the case where "the rotary shaft A3, the center C of the third lens group G3, and the detection center Rp of the Hall element 406d are disposed approximately on one straight line L" refers also to, in addition to the case where the rotary shaft A3, a center of the optical axis, and the detection center Rp are disposed on one straight line, a case where, in the state where the movable area of the detection center Rp of the Hall element 406d lies within the usable region of the magnet 462e, the rotary shaft A3, the center of the optical axis, and the detection center Rp are shifted from one another.

(5). In the image stabilizing device 400, a line segment connecting the rotary shaft A3 to the detection center Ry of the Hall element 406c substantially coincides with the yawing direction (X-axis direction). Therefore, in the state where the optical axis A coincides with the center C of the third lens group G3, it becomes easier for the movable area of the detection center Ry of the Hall element 406c to fall within the usable region of the magnet 462c. Thus, it is possible to prevent deterioration of the precision in position detection in the pitching direction. Herein, the case where "a line segment connecting the rotary shaft A3 to the detection center Ry of the Hall element 406c substantially coincides with the yawing direction" refers also to, in addition to the case where this line segment completely coincides with the yawing direction, a case where, in the state where the movable area of the detection center Ry of the Hall element 406c lies within the usable region of the magnet 462c, this line segment and the yawing direction are shifted from each other.

(6). In the image stabilizing device 400, in the state where the optical axis A coincides with the center C of the third lens group G3, the detection center Ry of the Hall element 406c substantially coincides with the polarization line Qy of the magnet 462c. Therefore, when the correction lens holding member 405 is driven in the pitching direction, a positional shift between the detection center Ry of the Hall element 406c and the polarization line Qy of the magnet 462c is suppressed. As a result, it becomes easier for the movable area of the detection center Ry of the Hall element 406c to fall within the usable region of the magnet 462c. Thus, it is possible to prevent deterioration of the precision in position detection in the pitching direction.

Herein, the case where "the detection center Ry of the Hall element 406c substantially coincides with the polarization line Qy of the magnet 462c" refers also to, in addition to the case where the detection center Ry completely coincides with the polarization line Qy, a case where, in the state where the movable area of the detection center Ry of the Hall element 406c lies within the usable region of the magnet 462c, the detection center Ry and the polarization line Qy are shifted from each other.

(7). In the image stabilizing device 400, the distance L1 between the rotary shaft A3 and the center Pp of the coil 406b is longer than the distance L0 between the rotary shaft A3 and the center C of the third lens group G3. Therefore, a center of gravity of a portion of the image stabilizing device 400, which is movable in the yawing direction (portion constituted by the correction lens holding member 405, the lens holding member 408, and the like), is positioned in the vicinity of the center C of the third lens group G3 when seen from the Y-axis direction.

For example, it is assumed that when a self-weight W [N] of the movable portion acts on the negative side in the Z-axis direction, a center of gravity of the movable portion of the image stabilizing device 400 is positioned in the vicinity of the center C of the third lens group G3. Where a distance from the rotary shaft A3 to a point of action of the self-weight W is denoted as L [m] and a distance from the rotary shaft A3 to the center Pp of the coil 406b is denoted as L1 [m], by moment equilibrium, the electromagnetic force Fp [N] required in the electromagnetic actuator for rotation 412 in order to support the self-weight W is expressed as follows.

$$Fp \times L1 = W \times L$$

As shown in FIG. 12, since L<L1, a relationship Fp<W is established. That is, it is possible to perform driving in the pitching direction using a driving force smaller than a force required to support the real weight.

According to the above-described configuration, compared with the case of the conventional image stabilizing device, a smaller electromagnetic force can be used as the electromagnetic force Fp required in the electromagnetic actuator for rotation 412. This allows miniaturization of the electromagnetic actuator for rotation 412 to be achieved and power consumption of the image stabilizing device 400 to be reduced.

Particularly in the case where, as has been explained in this example, the electromagnetic actuator for rectilinear movement is used for correction in the yawing direction and the electromagnetic actuator for rotation is used for correction in the pitching direction, it is possible to achieve a significant effect of reducing power consumption in a camera apparatus using the image stabilizing device 400.

(8). In the image stabilizing device 400, the distance L2 between the rotary shaft A3 and the detection center Rp of the Hall element 406d is shorter than the distance L1 between the rotary shaft A3 and the center Pp of the coil 406b. Therefore, a movable area of the Hall element 406d in the pitching direction is decreased, so that it is possible to allow the movable area of the detection center Rp of the Hall element 406d to fall within the usable region of the magnet 462e. Thus, it is possible to prevent deterioration of the precision in position detection in the pitching direction.

(9). In the image stabilizing device 400, with respect to the rotary shaft A3, the electromagnetic actuator for rectilinear movement 413, the third lens group G3, and the electromagnetic actuator for rotation 412 are arranged in this order on the negative side in the X-axis direction. Herein, where a movement amount of a correction lens is denoted as a, a position detection error Ps_1 of the Hall element 406c, which is a position detection element for rectilinear movement, due to rotation can be expressed by:

$$Ps\_1=(L0\_1-L3\_1)\times(1-\cos(\sin-1(\alpha/L0\_1))).$$

Meanwhile, in the case of an arrangement of the constituent elements in a second example, i.e. the case where, with respect to the rotary shaft A3, the electromagnetic actuator for rectilinear movement 413 is arranged on the positive side in the X-axis direction, and the third lens group G3 and the electromagnetic actuator for rotation 412 are arranged in this order on the negative side in the X-axis direction, similarly, a position detection error Ps_2 of the Hall element 406c can be expressed by:

$$Ps\_2=(L0\_2+L3\_2)\times(1-\cos(\sin-1(\alpha/L0\_1))).$$

Herein, in order to obtain correction lens holding members of substantially the same size as the correction lens holding members 405, for example, the following values are set.

$$\alpha=0.2 \text{ [mm]}$$

$$L0\_1=15 \text{ [mm]}$$

$$L3\_1=5 \text{ [mm]}$$

$$L0\_2=7 \text{ [mm]}$$

$$L3\_2=5 \text{ [mm]}$$

In this case, the position detection errors in the respective arrangements are determined as follows:

$$Ps\_1=0.001 \text{ [mm]}$$

$$Ps\_2=0.005 \text{ [mm]}.$$

Thus, arcs formed by movement tracks of the detection center Rp of the Hall element 406d and the detection center Ry of the Hall element 406c, which result from the correction lens holding member 405 being rotated about the rotary shaft A3 by the action of the electromagnetic actuator for rotation 412, are in the same direction with respect to the rotary shaft A3, and thus a positional shift in the rectilinear direction caused due to rotation can be reduced.

Thus, it is possible to prevent deterioration of the precision in position detection in the rectilinear direction.

(10). In the image stabilizing device 400, the distance L3 between the rotary shaft A3 and the detection center Ry of the Hall element 406c is shorter than the distance L4 between the rotary shaft A3 and the center Py of the coil 406c. Therefore, a movable area in the pitching direction of the Hall element 406c is smaller than a movable area in the pitching direction of the coil 406a. As a result, it is possible to allow the movable area of the detection center Ry of the Hall element 406c to fall within the usable region of the magnet 462c. Thus, it is possible to prevent deterioration of the precision in position detection in the yawing direction.

(11). In the image stabilizing device 400, a flexible portion 492 of the flexible printed board 490 is disposed on the side of the rotary shaft A3 relative to the third lens group G3. Therefore, a deformation amount of the flexible portion 492 in the case where the correction lens holding member 405 moves in the pitching direction can be minimized, and thus disconnection of the flexible printed board 490 can be prevented.

Furthermore, when the deformation amount of the flexible portion 492 is decreased, a driving force required to drive the correction lens holding member 405 in the pitching direction is decreased. Thus, the image stabilizing device 400 can achieve a reduction in power consumption.

(12). In the image stabilizing device 400, the third lens group G3 is disposed in a region between the electromagnetic actuator for rotation 412 and the electromagnetic actuator for rectilinear movement 413. That is, the electromagnetic actuator for rectilinear movement 413 and the electromagnetic actuator for rotation 412 are disposed on both sides of the third lens group G3, respectively. Accordingly, the image stabilizing device 400 has an increased length generally in one direction (the X-axis direction as the yawing direction in this embodiment). In other words, it is possible to reduce the dimension in the Z-axis direction (pitching direction) orthogonal to the X-axis direction.

(13). In the image stabilizing device 400, the correction lens holding member 405 and the lens holding member 408 are engaged with each other by the first supporting portions 486, 487, and 488 and the second supporting portions 483, 484, and 485, thus forming a configuration in which movement of the correction lens holding member 405 in the Y direction is restricted, and, on the X-Z plane, the correction lens holding member 405 is rotatable about the rotary shaft A3 and is movable rectilinearly in the X-axis direction.

Furthermore, one of each pair composed of one of the first supporting portions and one of the second supporting portions is formed to be a rod-like body, while the other is formed in substantially a U shape. According to this configuration, it is possible to restrict movement of the correction lens holding member 405 in the direction of the optical axis A with respect to the lens holding member 408. Further, the correction lens holding member 405 is supported in the pitching direction and in the yawing direction using a single-stage configuration, and thus compared with the conventional image stabilizing lens having a two-stage configuration, it is possible to reduce an inclination of the correction lens holding member 405 with respect to the perpendicular direction of the optical axis A.

Although in this example, one of each pair composed of one of the first supporting portions and one of the second supporting portions is formed to be a rod-like body, while the other is formed in substantially a U shape, the supporting may be achieved without limitation thereto. For example, one of each pair composed of one of the first supporting portions and one of the second supporting portions may take the form of a plate-shaped elastic body, while the other may have a cylindrical shape or a spherical shape.

(14). Furthermore, in the image stabilizing device 400, in an engaging gap portion between each of pairs of the first supporting portion 483 and the second supporting portion 486, the first supporting portion 484 and the second supporting portion 487, and the first supporting portion 485 and the second supporting portion 488, grease (not shown) having a consistency of 310 to 340 is interposed to provide lubrication.

This allows the correction lens holding member 405 to move on the X-Z plane smoothly. Further, this can provide a damping effect of suppressing swings in the Y-axis direction in the engaging gap portion between each of the pairs of the first supporting portion 483 and the second supporting portion 486, the first supporting portion 484 and the second supporting portion 487, and the first supporting portion 485 and the second supporting portion 488.

In the case of using, as one example, grease mainly containing perfluoropolyether (PFPE) as a base oil and polytetrafluoroethylene (PTFE) as a thickening agent and set to have a consistency of 310 to 340, it is possible to decrease frictional resistance (decrease power consumption). Further, interposing the grease in the engaging portion allows the damping effect to be exerted by the viscosity of the grease with respect to backlash caused due to a gap in the engaging portion between each pair of the supporting portions.

Figure 15A:
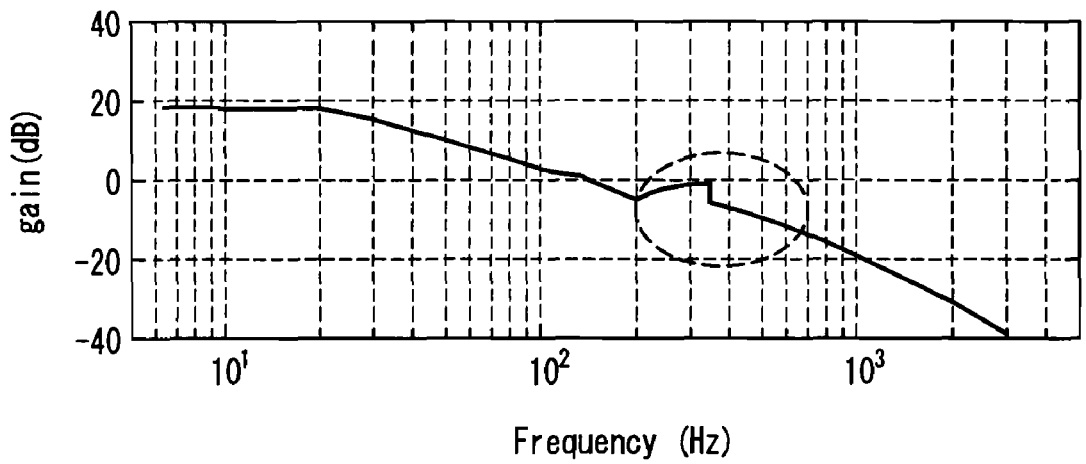
FIG. 15A is a graph showing a damping effect provided by grease.
Figure 15B:
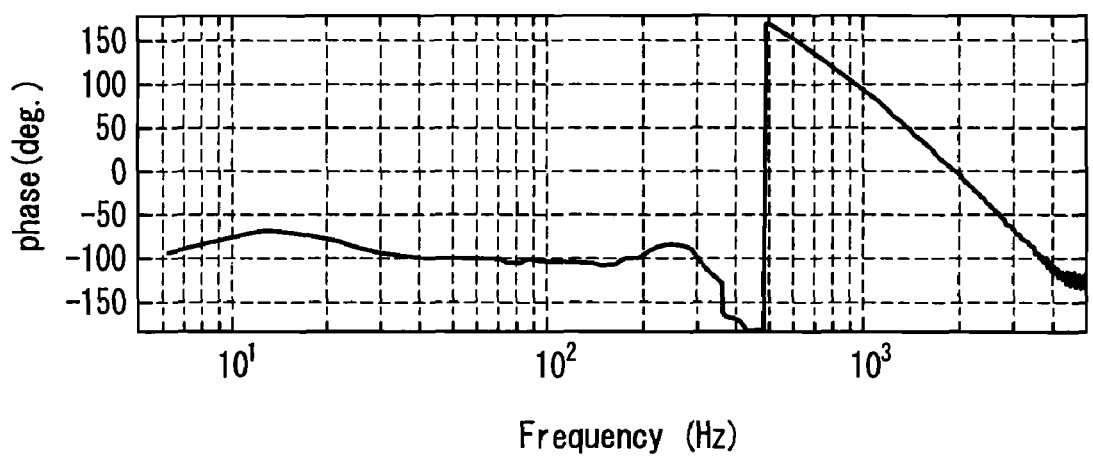
FIG. 15B is a graph showing the damping effect provided by the grease.
Figure 15C:
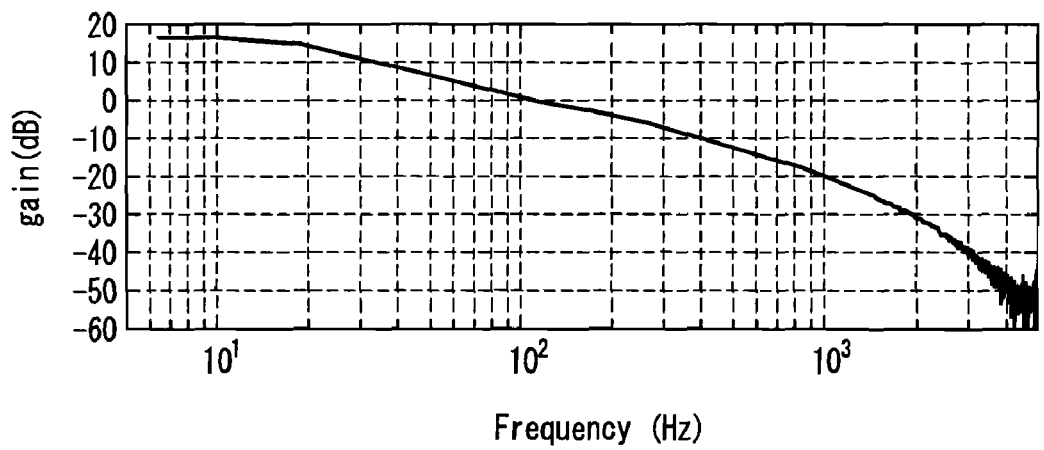
FIG. 15C is a graph showing a damping effect provided by grease.
Figure 15D:
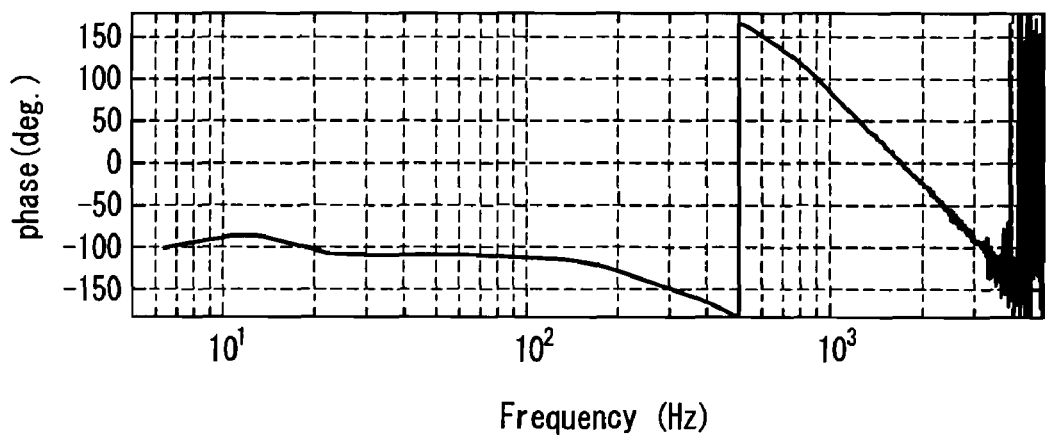
FIG. 15D is a graph showing the damping effect provided by the grease.

Herein, FIGS. 15A to 15D are diagrams showing the damping effect provided by grease. FIGS. 15A and 15B show graphs of measurement results of open-loop characteristics of the image stabilizing device in which grease having a consistency of 355 to 385 is applied. FIGS. 15C and 15D show graphs of measurement results of the open-loop characteristics of the image stabilizing device in which grease having a consistency of 310 to 340 is applied. As shown in FIGS. 15A and 15B, the case of applying the grease having a consistency of 355 to 385 exhibits the occurrence of resonance at a frequency of 350 Hz. Meanwhile, as shown in FIGS. 15C and 15D, the case of applying the grease having a consistency of 310 to 340 exhibits no such occurrence of resonance at a frequency of 350 Hz. This explains that the damping effect can be exerted by adjusting the consistency of grease.

The type of grease used is not restricted to the above-described example. Although the grease containing PFPE as a base oil and PTFE as a thickening agent has been presented as one example, grease containing an olefin-based synthetic oil as a base oil and lithium soap as a thickening agent also can be used Moreover, in the above-described example, a sliding portion has a gap of about 7 to 20 μm as one example. Generally, when grease having a consistency lower than 310 is applied, while a viscous load of the sliding portion is increased to allow the damping effect to be enhanced, it is conceivable that the power consumption of the image stabilizing device could be increased. The consistency of grease may be adjusted based on a gap of the sliding portion and a required damping characteristic, load characteristics represented by power consumption, sliding characteristics, or the like.

Furthermore, an optimum consistency of grease to be applied may vary depending on the size of a gap of the engaging gap portion and a material used for the engaging portion.

(15). In the image stabilizing device 400, the yawing direction of the correction lens holding member 405 is determined by the sliding groove in the yawing direction (X direction) formed in the lens holding member 408 to which an imaging element such as a CCD is fixed. Therefore, a shift between the X direction of the imaging element such as a CCD and the yawing direction with respect to which correction is performed by the correction lens holding member 405 can be reduced, thereby allowing the precision in image stabilization to be enhanced.

(16). The method of manufacturing the image stabilizing device 400 basically makes it possible to assemble the image stabilizing device 400 without performing a process such as of adhesion, and thus improved precision and simplification of processes can be achieved. Further, the number of processes can be reduced, thereby allowing a manufacturing cost to be reduced.

(17). In the method of manufacturing the image stabilizing device 400, after the correction lens holding member 405 is assembled to the lens holding member 408, the shaft A4 is pressed into or fixed by adhesion to the boss portion 408a formed in the lens holding member 408, and thus areas of movement of the correction lens holding member 405 in the pitching direction and in the yawing direction with respect to the lens holding member 408 are restricted, thereby allowing restriction of the areas of movement to be preformed with precision.

(18). Although this example has been described based on an optical system by which light enters an imaging element such as a CCD with its optical axis being straight without being bent, a bending optical system also may be used as the optical system, in which case the thickness reduction of a camera apparatus can be achieved.

(19). Although in this example, image stabilization is performed with the rectilinear direction set to be the yawing direction and the rotation direction set to be the pitching direction, the directions also may be reversed, i.e. the directions can be set so that the rectilinear direction is the pitching direction and the rotation direction is the yawing direction. That is, the driving method and arrangement of the actuators are not limited by the directions with respect to which correction is performed.

(20). Although in this example, the electromagnetic actuators are configured by providing the correction lens holding member 405 with coils and by providing the lens holding member 408 with magnets, the configurations of the electromagnetic actuators are not limited thereto.

Figure 16:
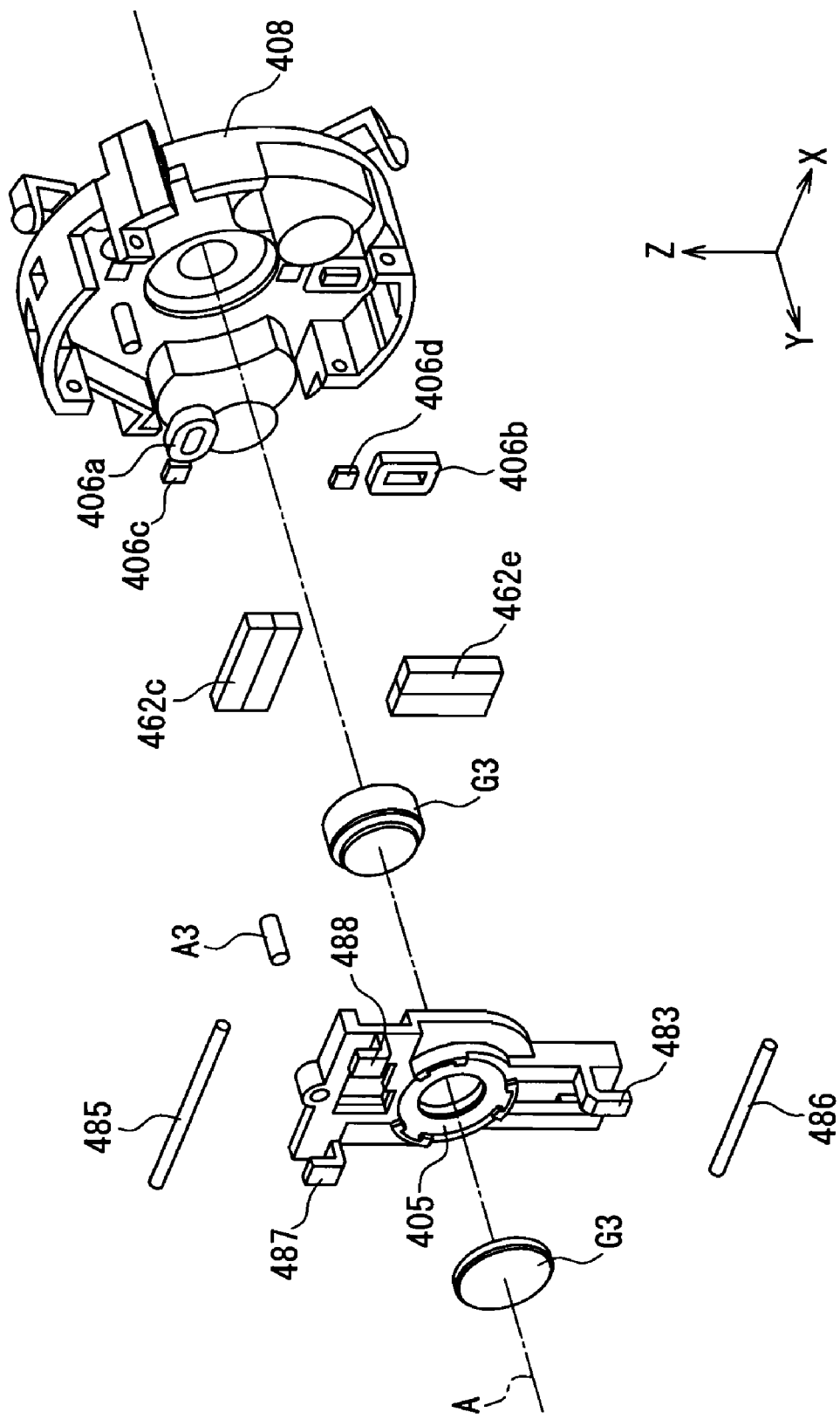
FIG. 16 is an exploded perspective view of an image stabilizing device with a modified actuator magnetic circuit.

For example, as shown in FIG. 16, actuators can be configured by providing the correction lens holding member 405 with magnets and by providing the lens holding member 408 with coils 406a and 406b.

FIG. 16 is a perspective view of an image stabilizing device with a modified actuator magnetic circuit as one example. In this drawing, the same components as in the image stabilizing device shown in FIG. 7 are denoted by the same reference numerals.

As shown in FIG. 16, in an image stabilizing device 400, the coil 406a and the coil 406b are fixed to a lens holding member 408. When energized, the coil 406b allows a correction lens holding member 405 to be driven to be rotated about a rotary shaft A3. The coil 406a allows the correction lens holding member 405 to be driven to move rectilinearly in the Z-axis direction. Moreover, in the image stabilizing device 400, position detection elements 406c and 406d, which are formed of a Hall element or the like, are fixed via a flexible board (not shown) in positions opposed to a magnet for rotation 462e and a magnet for rectilinear movement 462c, respectively.

Furthermore, the magnet for rotation 462e that is two-pole magnetized in the Z-axis direction and the magnet for rectilinear movement 462c that is two-pole magnetized in the X-axis direction are fixed to the correction lens holding member 405 holding a third lens group G3.

The correction lens holding member 405 further has the rotary shaft A3. Meanwhile, the lens holding member 408 has a sliding groove 482 (not shown) extending linearly in the pitching direction (Y-axis direction). The rotary shaft A3 is formed so as to have a diameter smaller than a groove width of the sliding groove 482 and is slidably and rotatably engaged with the sliding groove 482.

As shown in FIG. 16, the correction lens holding member 405 is supported so as to be movable in a plane orthogonal to an optical axis A, and a relative movement in the direction of the optical axis A is restricted. For this restriction, three restricting portions (supporting portions) (substantially U-shaped supporting portions 483, 487, and 488) are provided in a plane orthogonal to the X-axis. Moreover, the three portions are positioned so that a center of gravity of the correction lens holding member 405 lies within a triangle defined by connecting the three portions in a X-Z plane.

Moreover, in this configuration, non-magnetic metal shafts 485 and 486 having a diameter smaller than a width of an opening of each of the substantially U-shaped supporting portions 483, 487, and 488 are slidably engaged with opening portions of the substantially U-shaped supporting portions 483, 487, and 488, after which they are pressed into and fixed by means of, for example, adhesion, to the lens holding member 408. Thus, the correction lens holding member 405 is supported so that it is movable linearly in the pitching direction (Z-axis direction), it is movable in the yawing direction (X-axis direction), and it is rotatable about an axis parallel to the optical axis A.

With this configuration adopted, the coils 406a and 406b are fixed to the lens holding member 408 (fixed portion), and thus a flexible printed board having a flexible portion no longer is needed, thereby reducing the cost. Further, this configuration prevents the correction lens holding member 405 from being biased in one direction due to the elasticity of the flexible portion of the flexible print board, thereby allowing controllability to be Unproved.

In addition, this configuration prevents the flexible portion of the flexible board from being subjected repeatedly to a load due to movement of the correction lens holding member 405, and thus disconnection of the flexible board can be prevented, thus leading to improved reliability.

(21). Although this example has been explained using electromagnetic actuators as the actuators, the configuration of the actuators is not limited to an electromagnetic actuator, and the actuators can be formed also of an actuator using vibrations of a piezoelectric element, a motor such as a stepping motor, or the like.

[6. Second Configuration Example of Image Stabilizing Device]

Figure 17:
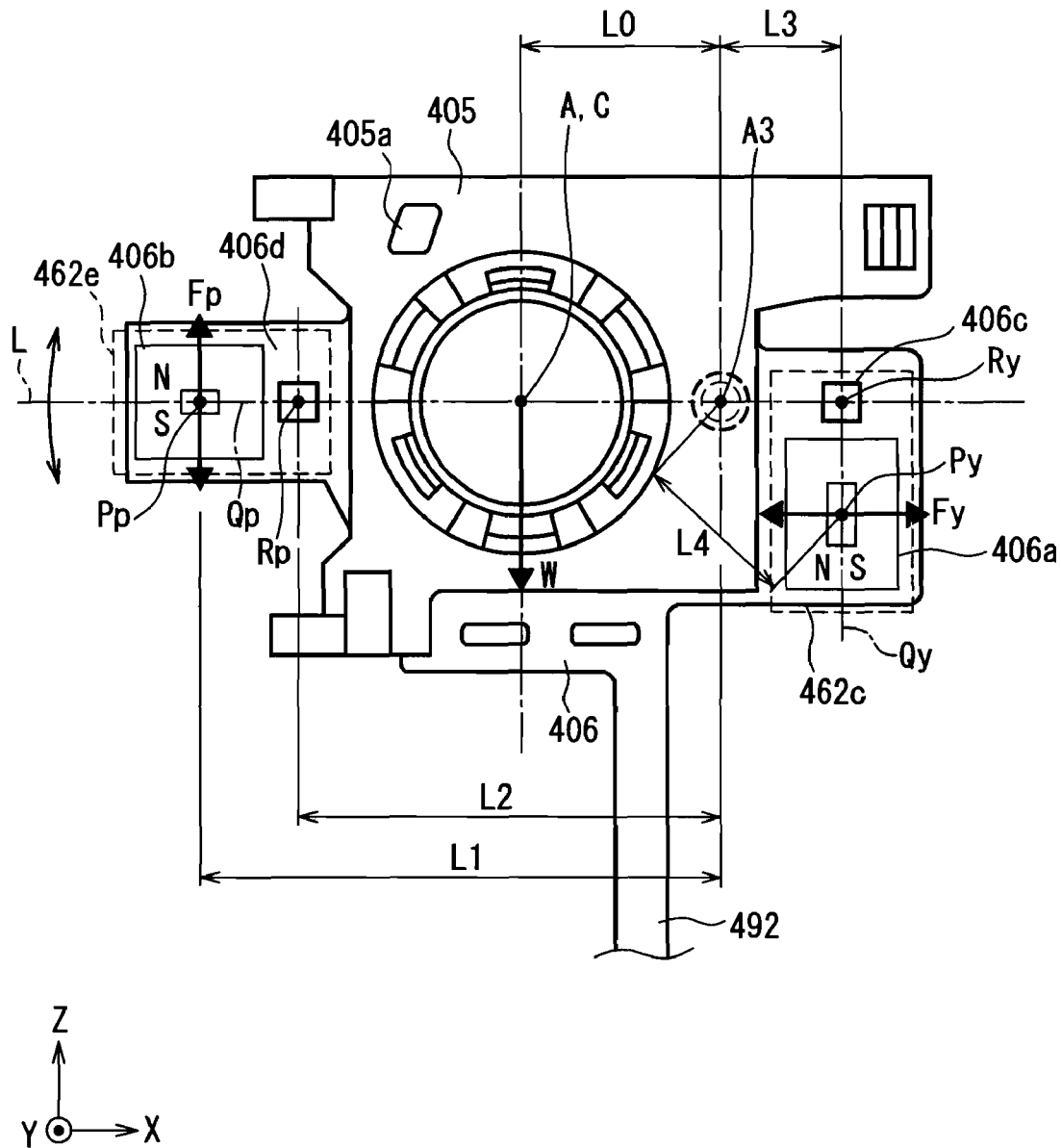
FIG. 17 is a schematic plan view of a correction lens holding member and an electric substrate as seen from a positive side in a Y-axis direction (another embodiment).
Figure 18:
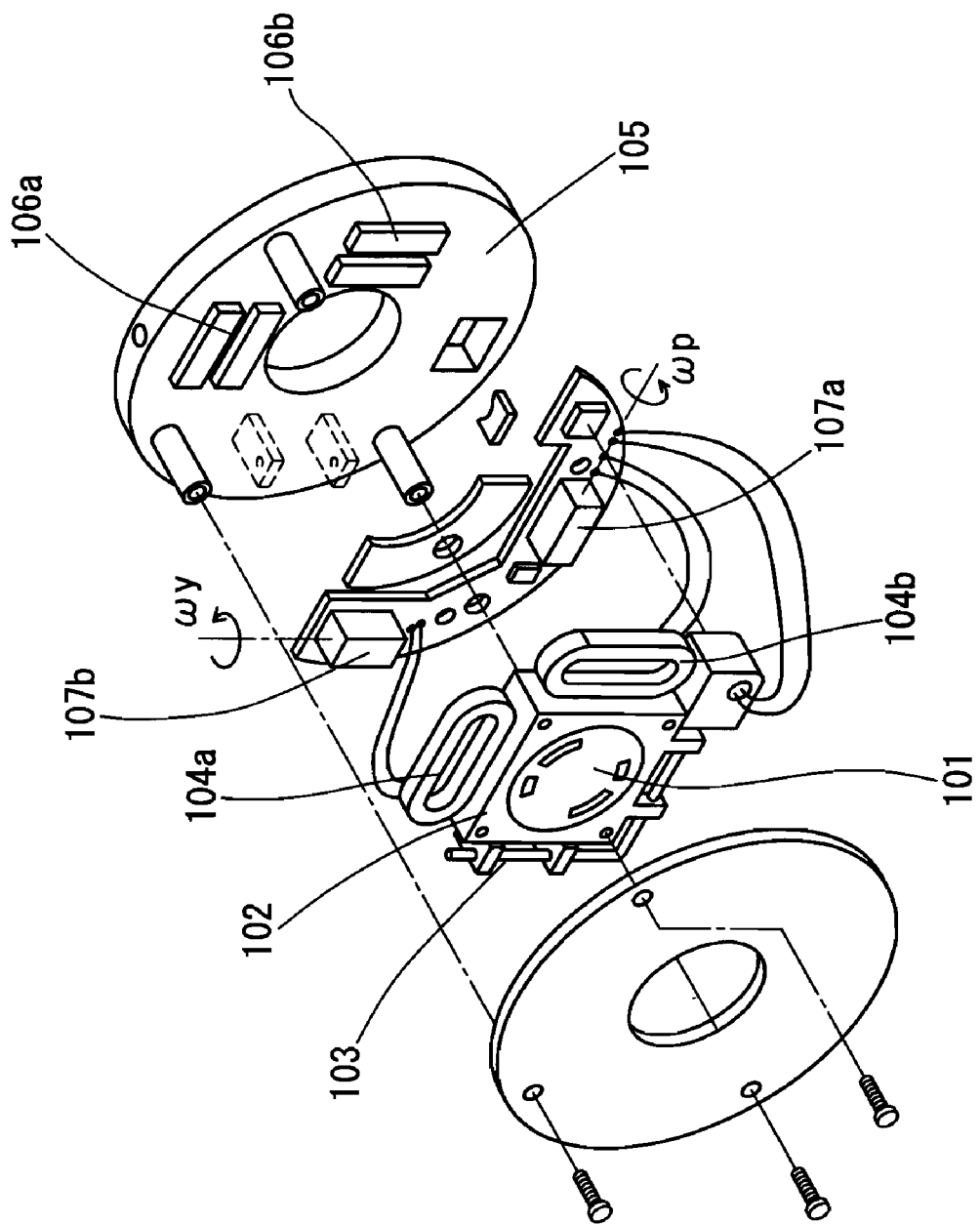
FIG. 18 is an exploded perspective view of a conventional image stabilizing device.
Figure 19:
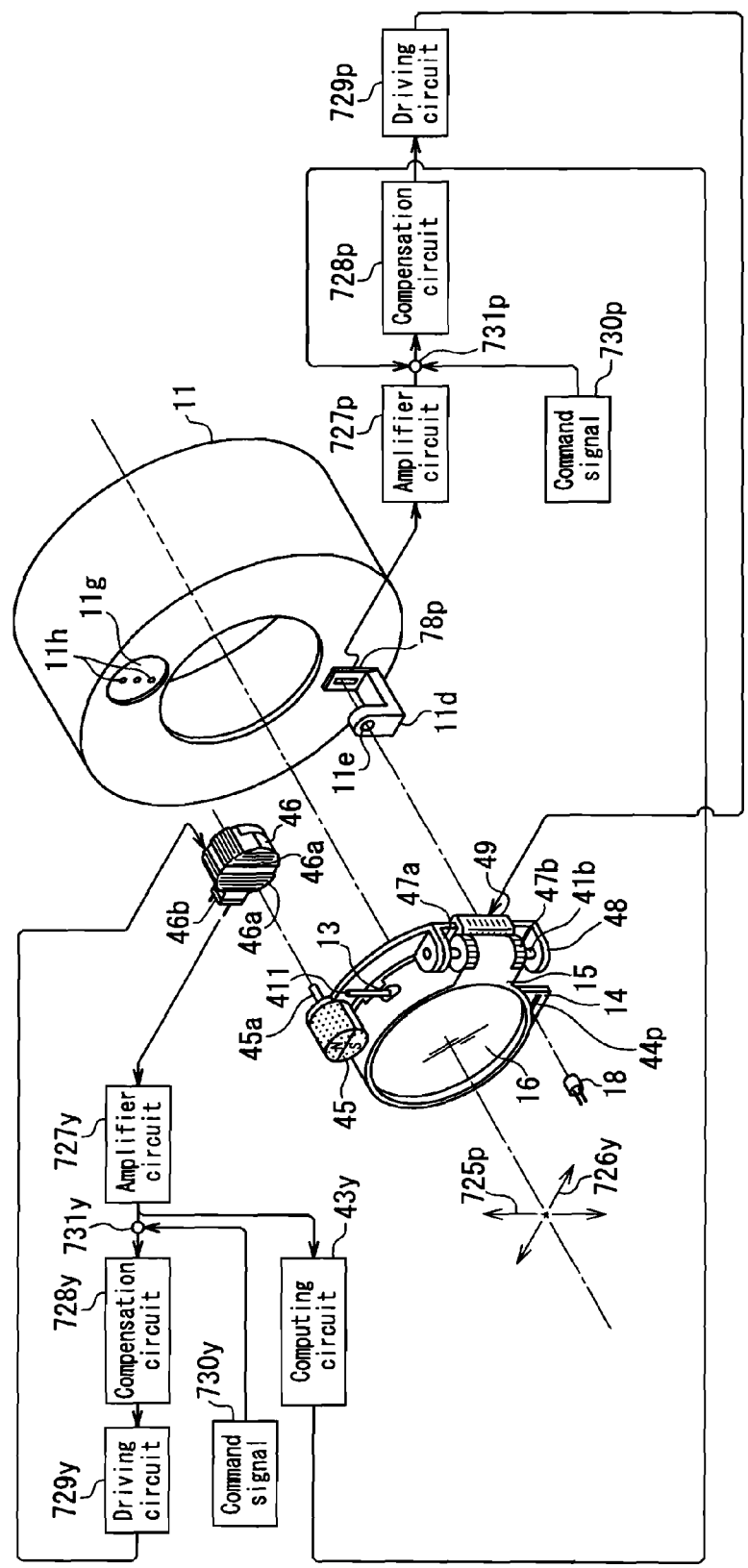
FIG. 19 is an exploded perspective view of a conventional image stabilizing device.
Figure 20:
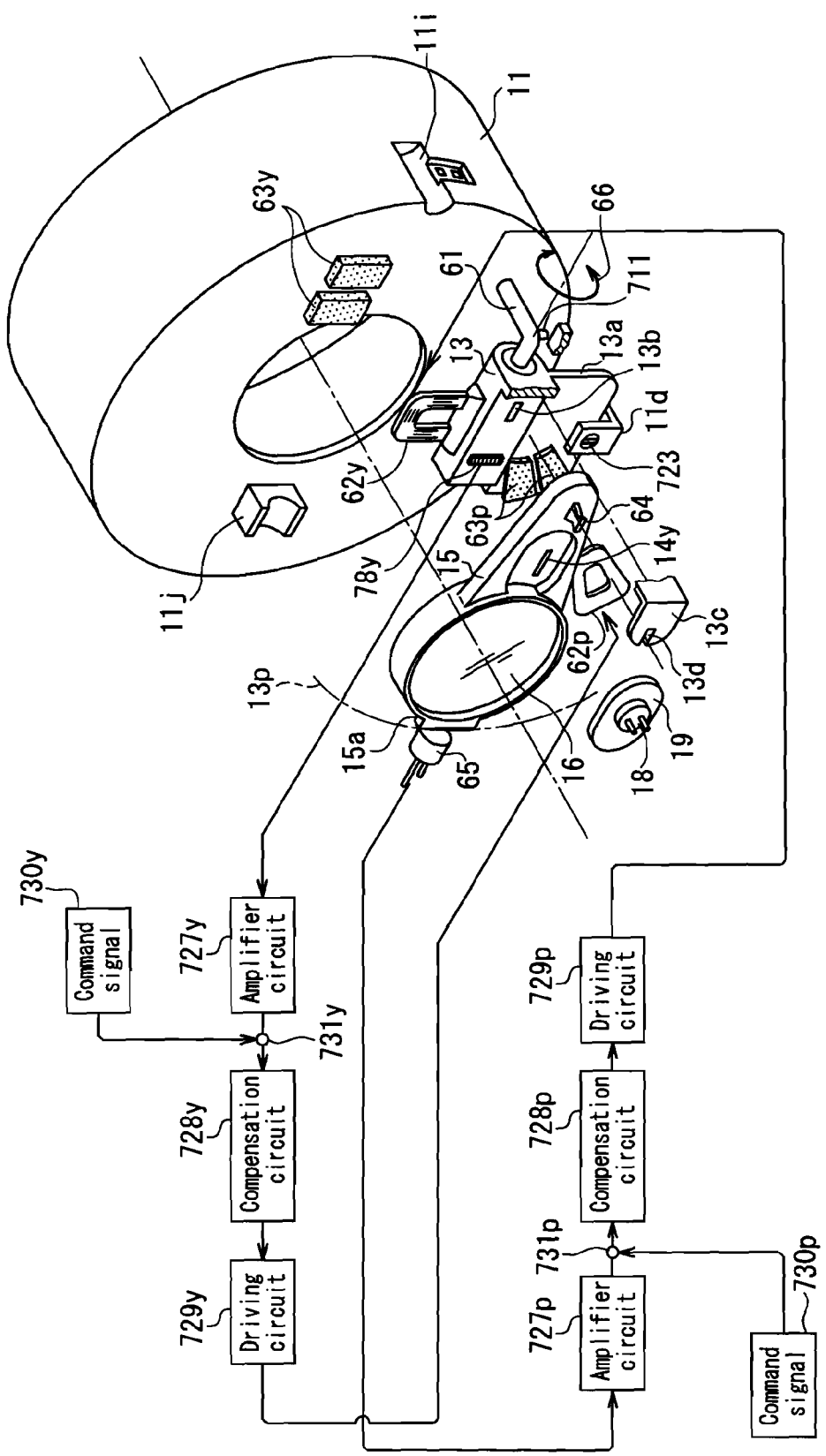
FIG. 20 is an exploded perspective view of a conventional image stabilizing device.

Although in the above-described image stabilizing device 400, with respect to the rotary shaft A3, the electromagnetic actuator for rectilinear movement 413, the third lens group G3, and the electromagnetic actuator for rotation 412 are arranged in this order on the negative side in the X-axis direction, an arrangement also may be adopted, in which, as shown in FIG. 17, with respect to the rotary shaft A3, the electromagnetic actuator for rectilinear movement 413 is arranged on the positive side in the X-axis direction, and the third lens group G3 and the electromagnetic actuator for rotation 412 are arranged in this order on the negative side in the X-axis direction.

In an image stabilizing device 400 adopting the above-described arrangement, a portion of the correction lens holding member 405, to which the third lens group G3 is fixed, is required to have sufficient strength to hold the third lens group G3. Accordingly, there is always part of the correction lens holding member 405 on the periphery of the third lens group G3. In this embodiment, when the image stabilizing device 400 is seen from the Y-axis direction, the third lens group G3 is surrounded by the correction lens holding member 405. The rotary shaft A3 is disposed in a region between the electromagnetic actuator for rectilinear movement 413 and the third lens group G3. Therefore, a space on the periphery of the third lens group G3 can be used effectively, and thus miniaturization of an apparatus can be achieved. Particularly, the dimension in the X-axis direction can be reduced.

As described above, in order to reduce a position detection error in the rectilinear direction caused due to rotation, it is preferable to incorporate an image stabilizing device having the first configuration in a camera apparatus. Further, in the case where an image stabilizing device having a reduced dimension in its longitudinal direction is required, it is preferable to incorporate an image stabilizing device having the second configuration in a camera apparatus. That is, an arrangement of the rotary shaft A3, the electromagnetic actuator for rectilinear movement 413, the third lens group G3, and the electromagnetic actuator for rotation 412 could be adopted selectively depending on a specification required of a camera apparatus.

INDUSTRIAL APPLICABILITY

The image stabilizing device and camera according to the present invention are useful in the field related to a camera required to achieve miniaturization and to provide image stabilizing performance.

The invention claimed is:

1. An image stabilizing device for correcting image blurring attributable to movement of a camera, the device comprising:
   a correction lens holding member to which a correction lens included in an optical system of the camera is fixed and that includes a rotary shaft substantially parallel to an optical axis of light entering the correction lens;
   a holding member that holds the correction lens holding member so that the rotary shaft is movable rectilinearly in a rectilinear direction that is an arbitrary direction in a plane orthogonal to the optical axis of light entering the correction lens and so that the correction lens holding member is rotatable in a rotation direction about the rotary shaft in the plane;
   a driving portion for rectilinear movement that applies a driving force to the correction lens holding member in order to drive the correction lens holding member in the rectilinear direction; and
   a driving portion for rotation that applies a driving force to the correction lens holding member in order to drive the correction lens holding member in the rotation direction.

2. The image stabilizing device according to claim 1, wherein the holding member comprises a groove that is formed in the rectilinear direction in the plane, and the rotary shaft is engaged with the groove so that the rotary shaft is movable along the groove.

3. The image stabilizing device according to claim 1, further comprising a position detection element for rotation that detects a position of the correction lens holding member in the rotation direction,
   wherein the driving portion for rotation has a magnet for rotation,
   a magnetic flux density distribution in the rotation direction of the magnet for rotation includes a usable region for rotation in which a magnetic flux density changes at substantially a constant rate,
   when seen from a direction along the optical axis, there exists a state where, in a region in which the correction lens holding member is movable, a detection center of the position detection element for rotation coincides with a center line of the usable region for rotation in the rotation direction, and
   either of the position detection element for rotation and the magnet for rotation is formed integrally with the correction lens holding member.

4. The image stabilizing device according to claim 3, wherein, when seen from the direction along the optical axis, in the state where the detection center of the position detection element for rotation coincides with the center line of the usable region for rotation in the rotation direction, a direction of the center line of the usable region for rotation in the rotation direction substantially coincides with the rectilinear direction.

5. The image stabilizing device according to claim 3, wherein, when seen from the direction along the optical axis, in a state where the optical axis of light entering the correction lens coincides with a center of the correction lens, the detection center of the position detection element for rotation substantially coincides with the center line of the usable region for rotation in the rotation direction.

6. The image stabilizing device according to claim 3, wherein, when seen from the direction along the optical axis, the rotary shaft, the center of the correction lens, and the detection center of the position detection element for rotation are disposed on substantially a straight line.

7. The image stabilizing device according to claim 1, further comprising a position detection element for rectilinear movement that detects a position of the correction lens holding member in the rectilinear direction,
wherein, when seen from the direction along the optical axis, a line segment connecting the rotary shaft to a detection center of the position detection element for rectilinear movement substantially coincides with the rectilinear direction.

8. The image stabilizing device according to claim 7, wherein the position detection element for rectilinear movement is disposed in a region between the rotary shaft and the correction lens.

9. The image stabilizing device according to claim 1, further comprising a position detection element for rectilinear movement that detects a position of the correction lens holding member in the rectilinear direction,
wherein the driving portion for rectilinear movement has a magnet for rectilinear movement,
a magnetic flux density distribution in the rectilinear direction of the magnet for rectilinear movement includes a usable region for rectilinear movement in which a magnetic flux density changes at substantially a constant rate, and
when seen from the direction along the optical axis, there exists a state where, in the region in which the correction lens holding member is movable, a detection center of the position detection element for rectilinear movement coincides with a center line of the usable region for rectilinear movement in the rectilinear direction.

10. The image stabilizing device according to claim 9, wherein, when seen from the direction along the optical axis, in the state where the optical axis of light entering the correction lens coincides with the center of the correction lens, the detection center of the position detection element for rectilinear movement substantially coincides with the center line of the usable region for rectilinear movement in the rectilinear direction.

11. The image stabilizing device according to claim 1, wherein the driving portion for rotation has a magnet for rotation and a coil for rotation that is disposed so as to be opposed to the magnet for rotation, and
when seen from the direction along the optical axis, a distance between the rotary shaft and a center of the coil for rotation is longer than a distance between the rotary shaft and the center of the correction lens.

12. The image stabilizing device according to claim 1, further comprising a position detection element for rotation that detects a position of the correction lens holding member in the rotation direction,
wherein the driving portion for rotation has a magnet for rotation and a coil for rotation that is disposed so as to be opposed to the magnet for rotation, and
when seen from the direction along the optical axis, a distance between the rotary shaft and the detection center of the position detection element for rotation is shorter than a distance between the rotary shaft and a center of the coil for rotation.

13. The image stabilizing device according to claim 1, wherein the rotary shaft is disposed in a region between the driving portion for rectilinear movement and the correction lens.

14. The image stabilizing device according to claim 1, further comprising a position detection element for rectilinear movement that detects a position of the correction lens holding member in the rectilinear direction,
wherein the driving portion for rectilinear movement has a magnet for rectilinear movement and a coil for rectilinear movement that is disposed so as to be opposed to the magnet for rectilinear movement, and
a distance between the rotary shaft and the detection center of the position detection element for rectilinear movement is shorter than a distance between the rotary shaft and a center of the coil for rectilinear movement.

15. The image stabilizing device according to claim 1, further comprising a flexible printed board that is connected electrically to the driving portion for rectilinear movement and the driving portion for rotation in order to supply a voltage to the driving portion for rectilinear movement and to the driving portion for rotation, respectively,
wherein the flexible printed board has a fixing portion that is fixed to the lens holding member and a flexible portion that couples the fixing portion and is deformable, and
the flexible portion is disposed on a side of the rotary shaft relative to the correction lens.

16. The image stabilizing device according to claim 1, wherein the correction lens is disposed in a region between the driving portion for rotation and the driving portion for rectilinear movement.

17. The image stabilizing device according to claim 1, wherein the holding member comprises at least three supporting portions that hold the correction lens holding member so that the correction lens holding member is movable freely in the plane orthogonal to the optical axis and restrict movement of the correction lens holding member to either side of the direction along the optical axis.

18. The image stabilizing device according to claim 17, wherein a center of gravity of the correction lens holding member lies within a diagram formed by connecting the supporting portions.

19. The image stabilizing device according to claim 18, wherein the center of gravity of the correction lens holding member substantially coincides with a center of gravity of the diagram formed by connecting the supporting portions.

20. The image stabilizing device according to claim 17, wherein each of the at least three sets of supporting portions has a first supporting portion that is formed in the holding member and a second supporting portion that is formed in the correction lens holding member and can be engaged with the first supporting portion from a direction orthogonal to the rotary shaft,
one of the first supporting portion and the second supporting portion is a rod-like body,
the other of the first supporting portion and the second supporting portion is a substantially U-shaped body to be engaged with the rod-like body with a predetermined gap kept between the substantially U-shaped body and the rod-like body, and
grease having a consistency of 310 to 340 is interposed in the engaging gap portion.

21. The image stabilizing device according to claim 1, wherein, after the correction lens holding member that holds the correction lens included in the optical system in order to perform image stabilization is assembled in the holding member, a movable area restriction member for restricting a movable area of the correction lens holding member is assembled in either of the correction lens holding member and the lens holding member.

22. The image stabilizing device according to claim 1, wherein the holding member comprises at least three sets of supporting portions that restrict movement of the correction lens holding member to either side of the direction along the optical axis.

23. The image stabilizing device according to claim 22, wherein each of the at least three sets of supporting portions has a first supporting portion that is formed in the holding member and a second supporting portion that is formed in the correction lens holding member and can be engaged with the first supporting portion with a predetermined gap from a direction orthogonal to the rotary shaft.

24. The image stabilizing device according to claim 23, wherein grease is interposed in the gap.

25. A camera, comprising:
an image stabilizing unit that corrects image blurring attributable to movement of the camera; and
an imaging portion that receives light that has passed through a lens group,
wherein the image stabilizing unit comprises:
a correction lens holding member to which a correction lens included in the lens group is fixed and that includes a rotary shaft substantially parallel to an optical axis of light entering the correction lens;
a holding member that holds the correction lens holding member so that the rotary shaft is movable rectilinearly in a rectilinear direction that is an arbitrary direction in a plane orthogonal to the optical axis of light entering the correction lens and so that the correction lens holding member is rotatable in a rotation direction about the rotary shaft in the plane;
a driving portion for rectilinear movement that applies a driving force to the correction lens holding member in order to drive the correction lens holding member in the rectilinear direction; and
a driving portion for rotation that applies a driving force to the correction lens holding member in order to drive the correction lens holding member in the rotation direction.

26. The camera according to claim 25, wherein a direction of rectilinear movement in the holding member of the image stabilizing device is set to be substantially a perpendicular direction with respect to a direction of gravity.

* * * * *